US006944469B2

(12) United States Patent
Jo et al.

(10) Patent No.: US 6,944,469 B2
(45) Date of Patent: Sep. 13, 2005

(54) APPARATUS AND METHOD FOR CONTROLLING TRANSMISSION POWER IN A MOBILE COMMUNICATION SYSTEM

(75) Inventors: Sung-Kwon Jo, Seoul (KR); Sang-Hyun Yang, Songnam-shi (KR); Jeong-Tae Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 338 days.

(21) Appl. No.: 10/194,692

(22) Filed: Jul. 12, 2002

(65) Prior Publication Data

US 2003/0054851 A1 Mar. 20, 2003

(30) Foreign Application Priority Data

Jul. 13, 2001 (KR) ........................................ 2001-42312

(51) Int. Cl.[7] ............................ H04B 7/00; H04Q 7/20

(52) U.S. Cl. ......................... 455/522; 455/69; 455/126; 455/452.1

(58) Field of Search .......................... 455/522, 69, 450, 455/451, 452.1, 509, 126, 63.1, 71, 127.1, 127.3, 127.4, 127.5

(56) References Cited

U.S. PATENT DOCUMENTS 5,838,732 A * 11/1998 Carney ........................ 375/297
5,930,299 A * 7/1999 Vannatta et al. ............ 375/269
5,991,262 A 11/1999 Laird et al.
6,236,864 B1 5/2001 McGowan et al.
6,366,619 B1 * 4/2002 McCallister et al. ........ 375/295
6,392,483 B2 * 5/2002 Suzuki et al. ............... 330/151
6,421,379 B1 * 7/2002 Vannatta et al. ............ 375/229
6,617,920 B2 * 9/2003 Staudinger et al. ......... 455/126
2001/0000456 A1 4/2001 McGowan

OTHER PUBLICATIONS

Harvatin et al., "Multi–Rate Modulation Scheme With Controlled Peak–to–Average Power Radio Using Balanced Incomplete Block Designs", 2001 IEEE, pp. 1028–1032.

* cited by examiner

*Primary Examiner*—Nay Maung
*Assistant Examiner*—John J. Lee
(74) *Attorney, Agent, or Firm*—Dilworth & Barrese LLP

(57) ABSTRACT

An apparatus and method for maximizing the efficiency of a power amplifier by reducing the PAPR of a BS in a mobile communication system. A power controller between I and Q channel pulse shaping filters and a frequency converter calculates cancellation signals for signal pulses that increase the PAPR at each sampling period, pulse-shape-filters cancellation signals at the highest levels among the cancellation signals, and adds the filtered cancellation signals to the original signals. Thus, spectral regrowth outside a signal frequency band is suppressed. In the case of a system supporting multiple frequency allocations, the PAPR is controlled for each FA according to its service class. Therefore, minimum system performance is ensured and power use efficiency is increased.

32 Claims, 19 Drawing Sheets

APPARATUS AND METHOD FOR CONTROLLING TRANSMISSION POWER IN A MOBILE COMMUNICATION SYSTEM

PRIORITY

This application claims priority to an application entitled "Apparatus and Method for Controlling Transmission Power in a Mobile Communication System" filed in the Korean Industrial Property office on Jul. 13, 2001 and assigned Serial No. 2001-42312, the contents of which are hereby incorporated by reference.

BACKGROUND OF THE INVENTION

1. Field of the Invention

The present invention relates generally to a mobile communication system, and in particular, to an apparatus and method for reducing the peak-to-average power ratio (PAPR) of a base station (BS) in a mobile communication system.

2. Description of the Related Art

As is known, a BS uses an RF (Radio Frequency) power amplifier for amplifying an RF signal including voice and data destined for a mobile station (MS). The RF amplifier is the most expensive device in the entire system and thus a significant component to be considered to reduce system cost. This RF amplifier should be designed to meet two requirements: one is to output RF power at a level strong enough to cover all MSs within the service area of a cell; and the other is to maintain ACI (Adjacent Channel Interference) with the output of the RF power amplifier at or below an acceptable level.

If input power that ensures sufficient RF output power is outside a linear amplification area of a power amplifier, the output signal of the power amplifier has a signal distortion component outside the signal frequency band due to non-linear amplification. In the frequency plane, in other words, spectral regrowth outside the signal frequency band causes ACI. It is very difficult to design a power amplifier satisfying these requirements because the former requires high input power and the latter requires low input power.

Especially, a system having a high PAPR such as CDMA (Code Division Multiple Access) must control the input power to enable the power amplifier to operate in the linear amplification area, or use an expensive power amplifier having linearity at maximum input power. In this context, the CDMA system needs an expensive power amplifier that can accommodate a maximum input power 10 dB higher than an average input power to suppress signal distortion. As stated above, however, such a power amplifier decreases power efficiency and increases power consumption, system size, and cost. Moreover, the BS transmits signals with a plurality of frequency allocations (FAs) at the same time using a power amplifier for each FA, thus imposing economic constraints. Therefore, efficient layout and design of power amplifiers is very significant to the design of BS.

One approach to stably operating a power amplifier in the high PAPR system is to use a pre-distortion adjusting circuit for maximum power input. The pre-distortion adjusting circuit measures signal distortion produced in the power amplifier and controls the input signal of the power amplifier based on the measurement. The power amplifier generates an amplified signal from the original input signal by attenuating the distortion.

A very complicated process is involved with the distortion measurement, such as modulation and demodulation, sampling, quantization, synchronization, and comparison between input and output. The pre-distortion adjusting circuit utilizes its input and output signals to meet ACP (Adjacent Channel Power) standards for system implementation. However, optimum distortion compensation cannot be achieved with this pre-distortion adjusting circuit due to its shortcomings associated with efficiency, speed, and complexity.

Another approach is to reduce the PAPR of an input signal in the power amplifier by decreasing the level of the signal at a predetermined rate using maximum input power and the linear amplification characteristics of the power amplifier. All input signals are converted to low power signals by multiplying them by scale factors based on the linear amplification characteristics in order to operate the power amplifier within the linear amplification area. Or the PAPR can be reduced by decreasing the power of an input signal at or above a threshold to an intended level. The decrease of the signal level at a predetermined rate or the decrease of a signal level greater than a threshold to a predetermined level results in drastic changes in the signal level and a power increase outside the signal frequency band. Consequently, the overall system performance is deteriorated.

A third approach is to calculate the strength and power of an I channel input signal and a Q channel input signal and generate cancellation signals for signals having strengths at or above thresholds. The signal strengths are reduced to a desired level by adding the original signals and the cancellation signals at the same time. Signal transmission using this amplification scheme is illustrated in FIG. 1.

Referring to FIG. 1, each channel device or channel element 1-2 in a channel device group 1-1 generates a baseband signal by subjecting input channel data to appropriate encoding, modulation and channelization in a CDMA communication system. The I and Q channel baseband signals are summed separately. A processor 1-5 measures the strengths of the I and Q channel signals, calculates their power levels, decides the strength of a signal to be removed for each channel according to a desired power level, and outputs cancellation signals. An I baseband combiner 1-3 and a Q baseband combiner 1-4 delay the I and Q channel signals by time required for the operation of the processor 1-5 and add the delayed I and Q channel signals to the cancellation signals to achieve signals at the intended power level. Pulse shaping filters 1-6 and 1-7 limit the bandwidths of the output signals of the I and Q baseband combiners 1-3 and 1-4. The outputs of the pulse shaping filters 1-6 and 1-7 are transmitted to an antenna through a frequency converter 1-8 and a power amplifier 1-9. The antenna radiates the transmission power of the BS to the MSs within its cell.

Although the PAPRs of the signals are adjusted to a desired value in the I and Q baseband combiner s 1-3 and 1-4, they increase in the pulse shaping filters 1-6 and 1-7. As a result, spectral regrowth outside the signal frequency band occurs in the power amplifier 1-9, thus causing ACI.

SUMMARY OF THE INVENTION

It is, therefore, an object of the present invention to provide a method and apparatus for increasing the use efficiency of an RF power amplifier to realize a stable, feasible mobile communication system.

It is another object of the present invention to provide a method and apparatus for stably operating a power amplifier in a linear amplification area in a high PAPR system.

It is a further object of the present invention to provide a method and apparatus for reducing the PAPR of an input signal of a power amplifier without influencing the performance of an entire system.

It is still another object of the present invention to provide a method and apparatus for reducing the PAR of a power amplifier and maximizing suppression of spectral regrowth outside a signal frequency band in order to maximize the efficiency of the power amplifier for transmission in a mobile communication system.

It is also still another object of the present invention to provide a method and apparatus for simultaneously transmitting signals using a plurality of FAs, using power amplifiers efficiently.

It is yet another object of the present invention to provide a method and apparatus for controlling the input signal of a power amplifier using a power controller between I and Q pulse shaping filters and a frequency converter.

To achieve the above and other objects, in a transmission power controlling apparatus in a mobile communication system supporting a single FA, a channel device group generates an I channel baseband signal and a Q channel baseband signal by performing encoding and modulation on each channel data, a pulse shaping filter filters the baseband signals, a power controller controls the PAPRs of the filtered signals according to a threshold power required for linear power amplification, a frequency converter upconverts the power-controlled signals to RF signals, and a power amplifier amplifies the RF signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Before describing the present invention, terms used herein will be defined. A PAPR or CF (Crest Factor) is a peak to average power ratio. This power characteristic is a significant factor to designing a power amplifier in a CDMA system in which multiple users share common frequency resources. A CFR (Crest Factor Reduction) algorithm is an algorithm that a power controller operates to reduce the PAPR according to the present invention. Backoff is defined to be the ratio of a maximum power required to achieve linear amplification to an average power. The backoff is used to indicate the linear operation area of a power amplifier.

FIGS. 2 to 12 depict an embodiment of the present invention using a single FA and FIGS. 13 to 19 depict another embodiment of the present invention using multiple FAs.

First Embodiment

Figure 1:
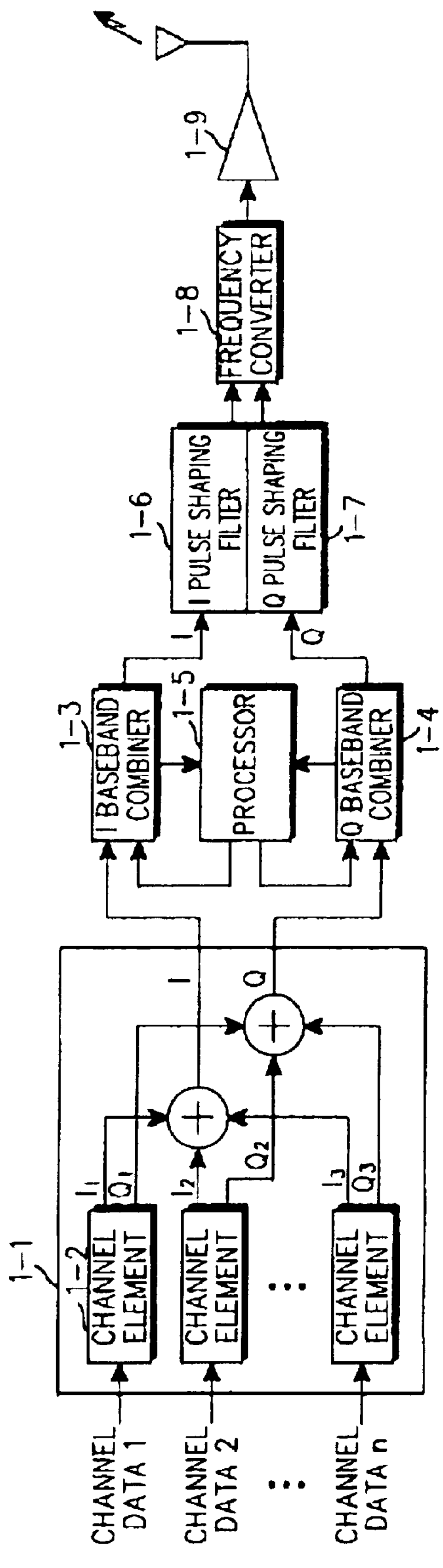
FIG. 1 is a block diagram of a transmitter in a typical mobile communication system in a prior art.
Figure 2:
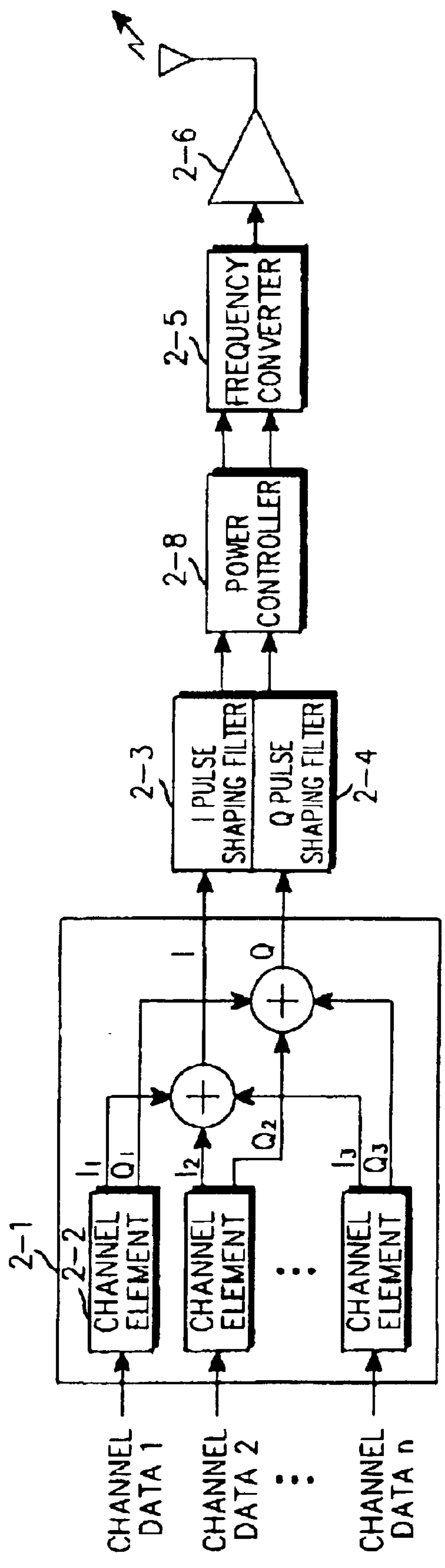
FIG. 2 is a block diagram of a transmitter in a mobile communication system using a single FA according to an embodiment of the present invention.

FIG. 2 is a block diagram of a BS transmitter in a mobile communication system using a single FA according to an embodiment of the present invention.

Referring to FIG. 2, the transmitter includes a channel device group 2-1 having at least one channel element 2-2, I and Q pulse shaping filters 2-3 and 2-4, a frequency converter 2-5, and a power amplifier 2-6. Especially a power controller 2-8 is disposed between the pulse shaping filters 2-3 and 2-4 and the frequency converter 2-5 to perform a CFR algorithm according to the present invention.

In operation, the channel device group 2-1 generates I and Q channel baseband signals by performing encoding, modulation and channelization on each channel data. Particularly in a CDMA system, the I and Q channel signals are the I and Q channel chip-level sums of common control signals and user data for multiple users.

Since a serious output power change occurs in a system that transmits the sum of multiple channel signals such as a CDMA system, the pulse shaping filters 2-3 and 2-4 limit the frequency of each channel signal to reduce ACI. The frequency converter 2-5 at the front end of the power amplifier 2-6 upconverts the IF(Intermediate Frequency) signals received from the pulse shaping filters 2-3 and 2-4 to RF signals after digital-analog conversion.

The power amplifier 2-6 is disposed at the front end of an antenna and amplifies the power of its input signal in order to transmit the signal with output power enough for all users within the cell of the BS. The antenna transmits the amplified signal to the MSs.

The power controller 2-8 functions to reduce the PAPR of an input signal to reduce the cost constraints of the power amplifier and prevent deterioration of system performance by suppressing spectral regrowth outside a signal frequency band. The power controller 2-8 is arranged at the rear ends of the pulse shaping filters 2-3 and 2-4 to prevent the increase of the PAPR during the operation of the pulse shaping filters 2-3 and 2-4.

Figure 3:
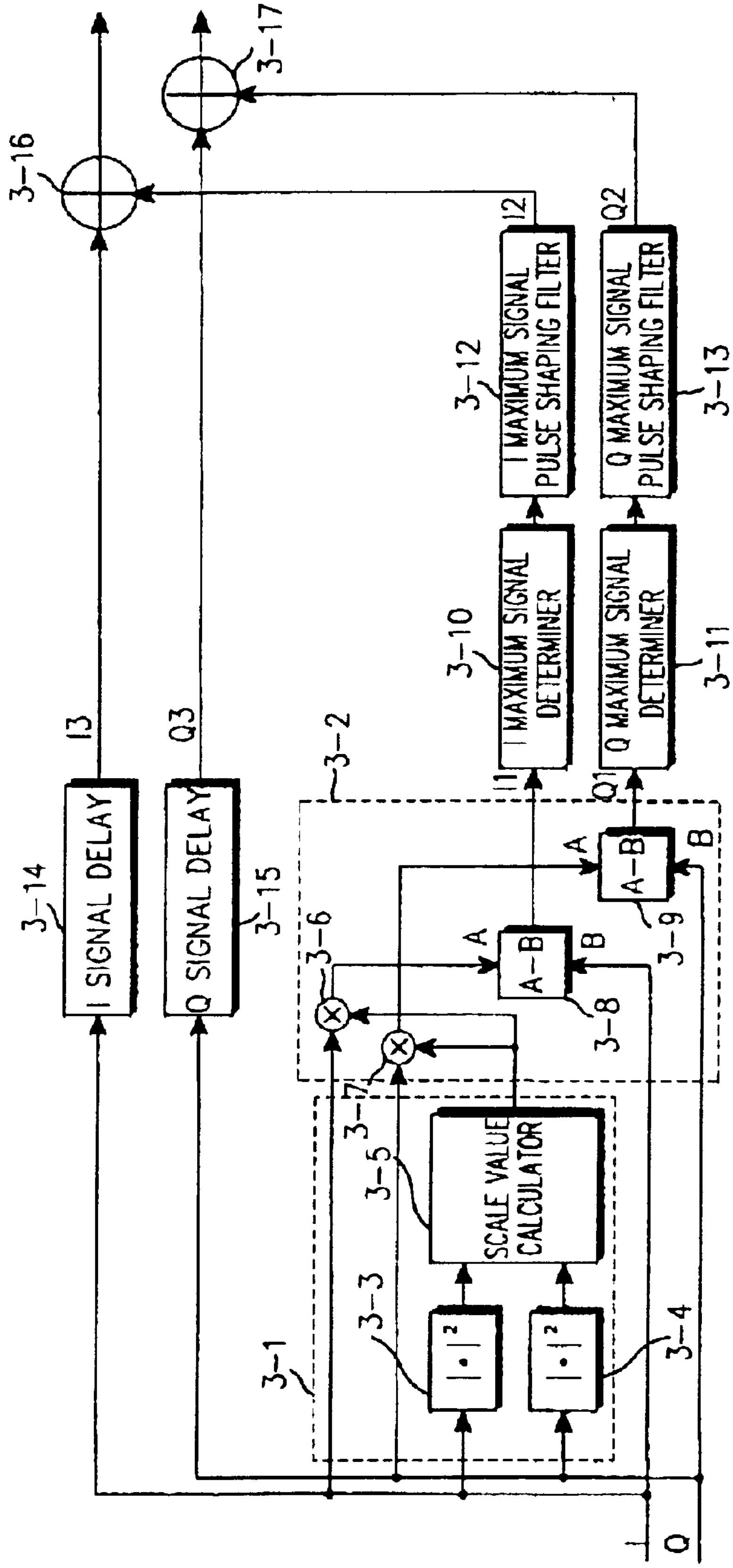
FIG. 3 is a detailed block diagram of a power controller illustrated in FIG. 2.

FIG. 3 is a detailed block diagram of the power controller 2-8 according to the embodiment of the present invention. Referring to FIG. 3, the power controller 2-8 is comprised of a scale determiner 3-1, a cancellation signal calculator 3-2, I and Q maximum signal determiners 3-10 and 3-11, I and Q maximum signal pulse shaping filters 3-12 and 3-13, I and Q signal delays 3-14 and 3-15, and I and Q channel summers 3-16 and 3-17.

The outputs of the pulse shaping filters 2-3 and 2-4 are applied to the input of the scale determiner 3-1, the signal delays 3-14 and 3-15, and the cancellation signal calculator 3-2. The output signal I2 of the I maximum signal pulse shaping filter 3-12 and the output signal I3 of the I signal delay 3-14 are added into a signal I' in the I channel summer 3-16. In the same manner, the output signal Q2 of the Q maximum signal pulse shaping filter 3-13 and the output signal Q3 of the Q signal delay 3-15 are added into a signal Q' in the Q channel summer 3-17.

The power controller 2-8 processes the output signals I and Q of the pulse shaping filters 2-3 and 2-4 to achieve a PAPR required for linearity of the power amplifier 2-6 and thus to suppress the spectral regrowth outside the signal frequency band.

With reference to FIG. 3, the operational principle of the power controller 2-8 will be described.

The scale determiner 3-1 receives the I channel signal output from the I pulse shaping filter 2-3 (hereinafter, referred to as the original I channel signal) and the Q channel signal output from the Q pulse shaping filter 2-4 (hereinafter, referred to as the original Q channel signal) at I and Q channel level squarers 3-3 and 3-4, samples the original I and Q channel signals at every predetermined period, and measures the levels of the sampled signals. The instant power at each sampling period is calculated by summing the outputs of the I and Q channel level squarers 3-3 and 3-4, that is, $P=I^2+Q^2$. The scale value calculator 3-5 calculates the instant power P and a predetermined threshold power $P_{th}$ in the following way.

The instant power P is compared with the threshold power $P_{th}$, which is determined by $$P_{th}=\text{average power}(P_{average})\times 10^{(backoff/10)} \tag{1}$$

If the instant power P is less than or equal to the threshold power $P_{th}$, scale values to be multiplied by the I and Q channel signals are determined to be 1s. This implies that the outputs I1 and Q1 of the cancellation signal calculator 3-2 are 0s and as a result, the power of the original signals is not controlled. On the other hand, if the instant power P is greater than the threshold power $P_{th}$, the scale values are determined to be values by which the power of the original signals is adjusted to reduce the PAPR by $$\text{scale value} = \sqrt{\frac{\text{threshold power}}{\text{instant power}}} \tag{2}$$

Alternatively, the scale values can be obtained referring to a scale table stored in a memory (not shown). These scale values are fed to the cancellation signal calculator 3-2.

Multipliers 3-6 and 3-7 in the cancellation signal calculator 3-2 multiply the scale values by the original I and Q channel signals. The outputs of the multipliers 3-6 and 3-7 are target signals of the I and Q channels required for linear operation of the power amplifier 2-6. That is, if the instant power P is greater than the threshold power $P_{th}$, the target signal of each channel, which has the threshold power $P_{th}$ and the same phase as the original channel signal, can be obtained by the multiplication. Subtractors 3-8 and 3-9 subtract the original I and Q channel signals from the target signals and generate the cancellation signals I1 and Q1.

Figure 4:
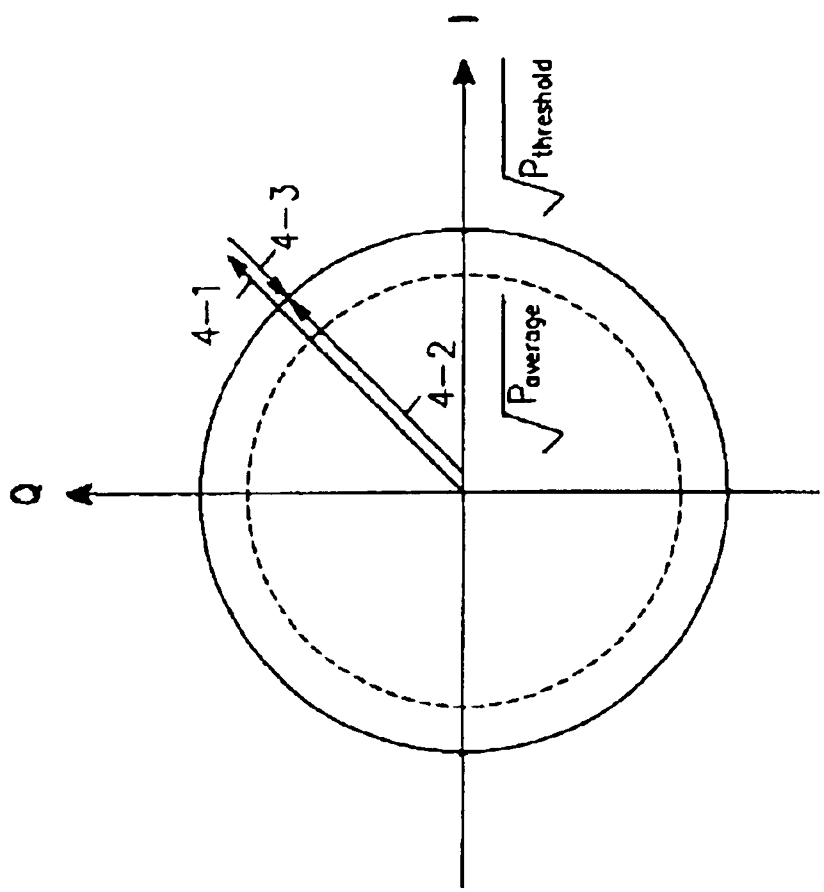
FIG. 4 illustrates the operational principle of a cancellation signal calculator in the power controller illustrated in FIG. 3.

FIG. 4 illustrates the operational principle of the cancellation signal calculator 3-2. Referring to FIG. 4, an original signal vector 4-1 represents the vector of the original I and Q channel signals output from the pulse shaping filters 2-3 and 2-4. A target signal vector 4-2 represents the vector of the target signal having the same phase as the original signal vector 4-1 and the threshold power. A cancellation signal vector 4-3 represents the vector of the cancellation signals I1 and Q1 output from the cancellation signal calculator 3-2 illustrated in FIG. 3. An outer solid circle indicates the threshold power and an inner dotted circle indicates the average power of the original signals. Here, the cancellation signal vector 4-3 is obtained by subtracting the original signal vector 4-1 from the target signal vector 4-2.

The cancellation signals produced in the above process of making the phases of the target signals equal to those of the original signals have the lowest power of all cancellation signals that reduce the PAPR of the original signals.

The cancellation signals I1 and Q1 are fed to the I and Q maximum signal determiners 3-10 and 3-11.

If pulses input to the I and Q maximum signal pulse shaping filters 3-12 and 3-13 have the same polarity and successive values other than 0s at each sampling period, the pulses are overlapped and have higher signal levels than the cancellation signals in the process of the pulse shaping filters 3-12 and 3-13. The output signals I2 and Q2 of the maximum signal pulse shaping filters 3-12 and 3-13 are summed with the output signals I3 and Q3 of the signal delays 3-14 and 3-15 in the summers 3-16 and 3-17, which may cause another signal distortion.

To solve this problem, the maximum signal determiners 3-10 and 3-11 maintain cancellation signal pulses having the same polarity and maximum levels between pulses at signal level 0 among the cancellation signals received at each sampling period, setting the other cancellation signals to 0s.

That is, the I and Q maximum signal determiners 3-10 and 3-11 select cancellation signals having the highest levels at each sampling period among successive received cancellation signals. Then the I and Q maximum signal pulse shaping filters 3-12 and 3-13 limit the highest level cancellation signals within a desired frequency bandwidth.

As described above, the maximum signal pulse shaping filters 3-12 and 3-13 function to suppress the increase of ACP and out-band distortion by limiting the frequency band of input signals to a desired bandwidth. Therefore, they can be FIR (Finite Impulse Response) or IIR (Infinite Impulse Response) filters for limiting the input signals within the bandwidth of the output signals I3 and Q3 of the signal delays 3-14 and 3-15.

Figure 5:
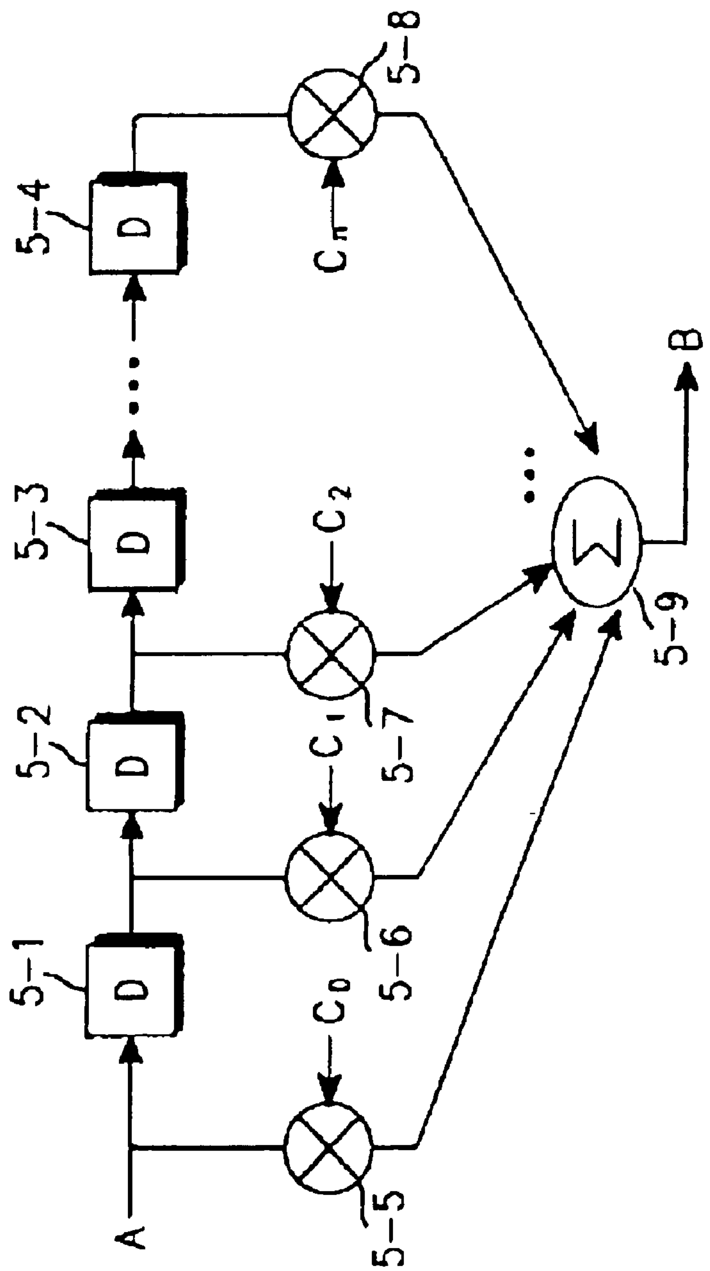
FIG. 5 illustrates the structure of pulse shaping filters illustrated in FIG. 3.

FIG. 5 illustrates the structure of the maximum signal pulse shaping filter 3-12 (or 3-13) being an FIR filter. Referring to FIG. 5, an input signal A from the maximum signal determiner 3-10 is delayed in delays 5-1 to 5-4. Signals at the inputs and outputs of the delays 5-1 to 5-4 are multiplied by coefficients $c_0$ to $c_n$ set according to a desired frequency band in multipliers 5-5 to 5-8. A summer 5-9 sums the outputs of the multipliers 5-5 to 5-8 and outputs the sum B. For the input of the signal B from the maximum signal pulse shaping filter 3-12 (or 3-13), the power controller 2-8 generates the signal I2 (or Q2) within the desired frequency band.

Returning to FIG. 3, the delays 3-14 and 3-15 delay the original I and Q channel signals by a predetermined time. The time delay is the time required for the original I and Q channels signals to pass from the scale determiner 3-1 through the maximum signal pulse shaping filters 3-12 and 3-13.

The summers 3-16 and 3-17 add the output signal 13 of the delay 3-14 to the output signal $I_2$ of the maximum signal pulse shaping filter 3-12 and the output signal Q3 of the delay 3-15 to the output signal $Q_2$ of the maximum signal pulse shaping filter 3-13. The signals I2 and Q2 are cancellation signals at the highest levels after processing in the maximum signal pulse shaping filters 3-12 and 3-13. Therefore, the output signals of the summers 3-16 and 3-17 are compensated to have power required for linearity of the power amplifier 2-6.

Figure 6:
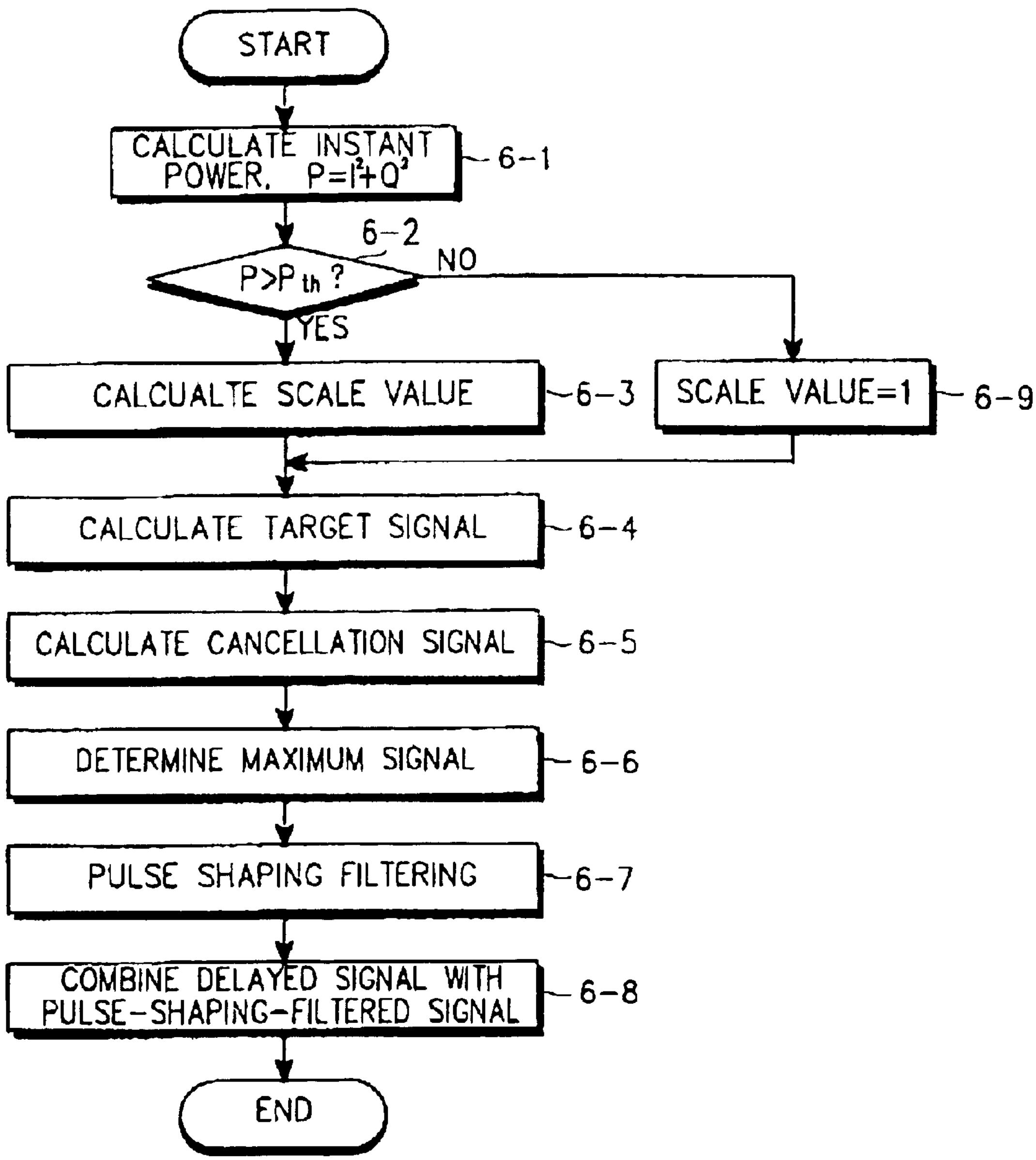
FIG. 6 is a flowchart illustrating a power control operation according to the embodiment of the present invention.

FIG. 6 is a flowchart illustrating the overall operation of the power controller 2-8 according to the embodiment of the present invention. Referring to FIG. 6, the scale determiner 3-1 measures the levels of the original I and Q channel signals received from the I and Q pulse shaping filters 2-3 and 2-4 and calculates the instant power P ($=I^2+Q^2$) in step 6-1, and compares the instant power P with a threshold power $P_{th}$ in step 6-2. If the instant power P is equal to or less than the threshold power $P_{th}$, the scale value is determined to be 1 in step 6-9. If the instant power P is greater than the threshold power $P_{th}$, the scale value is determined referring to a pre-stored scale table or by Eq. (2) in step 6-3.

The cancellation signal calculator 3-2 obtains target signal having the same phase as the original I and Q channel signal and the threshold power by multiplying the original I and Q channel signal by the scale value in step 6-4, and calculates the cancellation signal I1 and Q1 by subtracting the original I and Q channel signal from the target signal in step 6-5. The cancellation signal I1 and Q1 are used to achieve a required PAPR.

The maximum signal determiners 3-10 and 3-11 determine cancellation signal at the highest levels by repeating steps 6-1 to 6-5 at each sampling period in step 6-6. In step 6-7, the maximum signal pulse shaping filters 3-12 and 3-13 limit the transmitted bandwidth of the cancellation signal at the highest levels in step 6-7.

The summers 3-16 and 3-17 sum the outputs of the pulse shaping filters 3-12 and 3-13 with the original I and Q channel signals delayed by the delays 3-14 and 3-15 in step 6-8. As a result, the PAPRs of the sums are compensated to a desired level.

Figure 7:
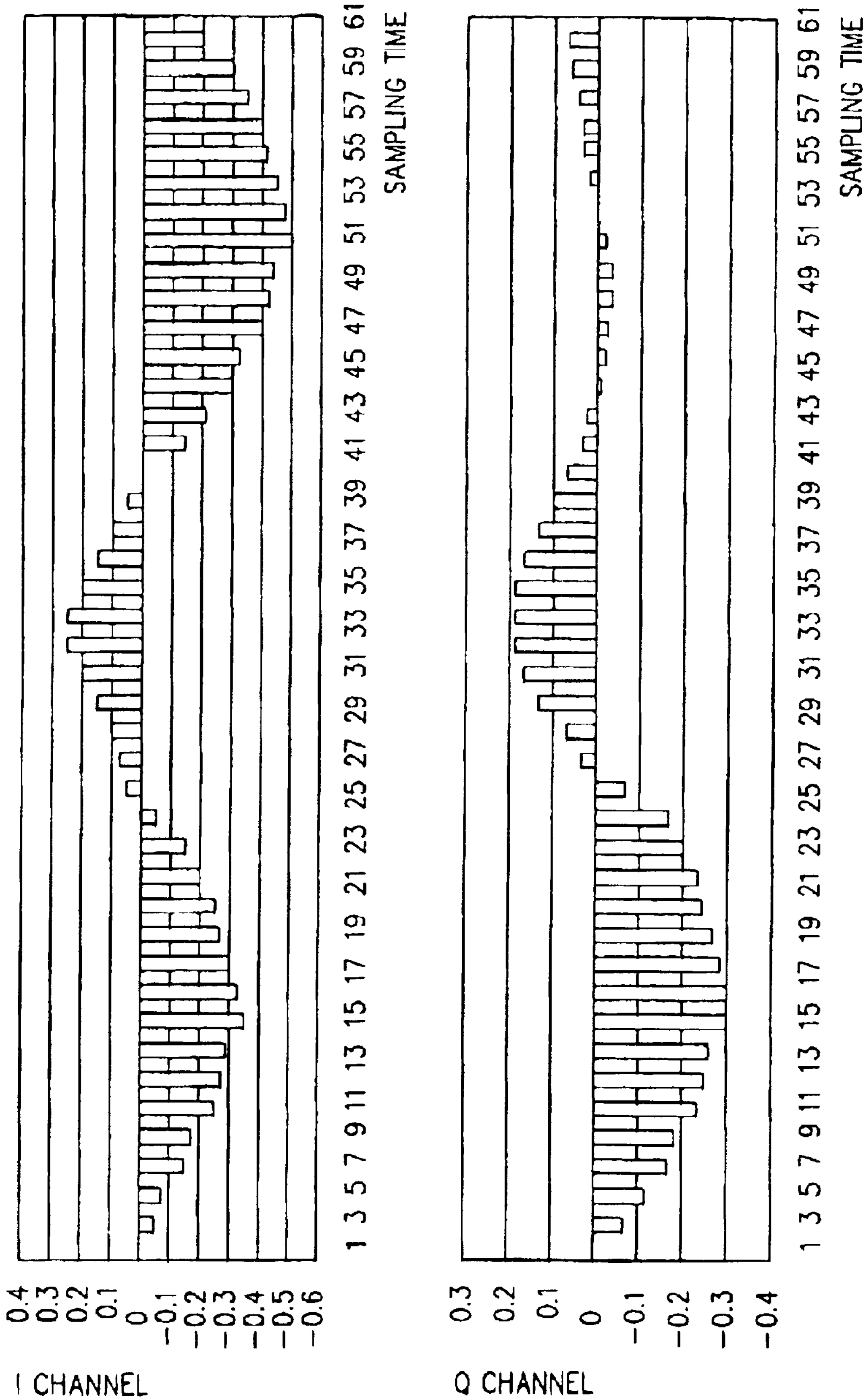
FIG. 7 illustrates original signals input to a scale determiner illustrated in FIG. 3.
Figure 8:
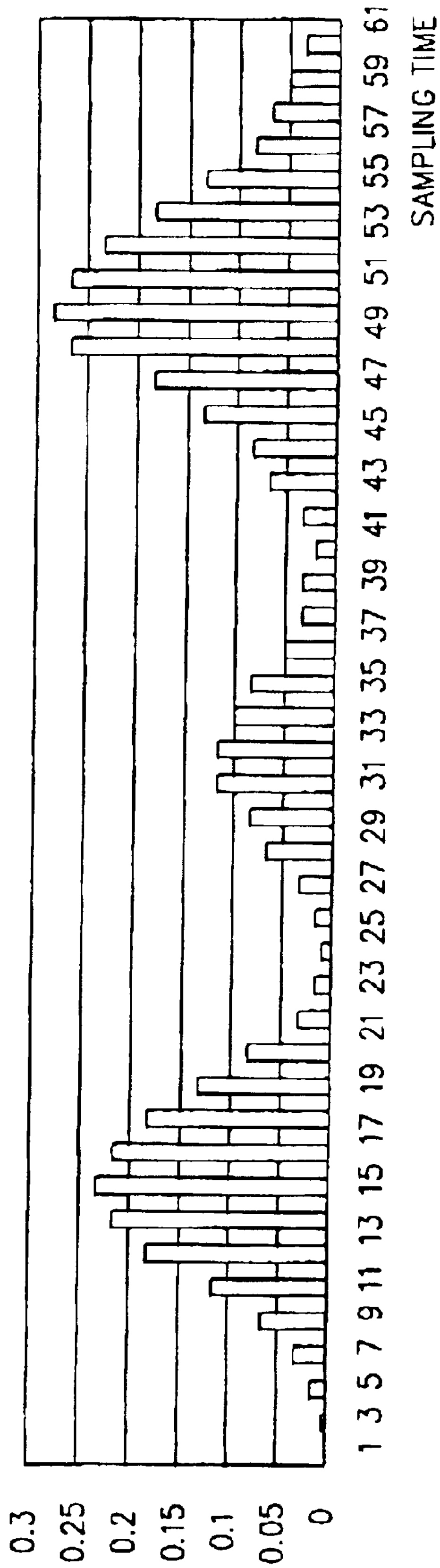
FIG. 8 illustrates signals output from the scale determiner illustrated in FIG. 3.

FIGS. 7 to 12 illustrate power changes made by the power controller 2-8. FIG. 7 illustrates I and Q channel signal levels measured after processing in the I and Q pulse shaping filters at each sampling period, and FIG. 8 illustrates the instant power levels P ($=I^2+Q^2$) of the sampled signals illustrated in FIG. 7.

Figure 9:
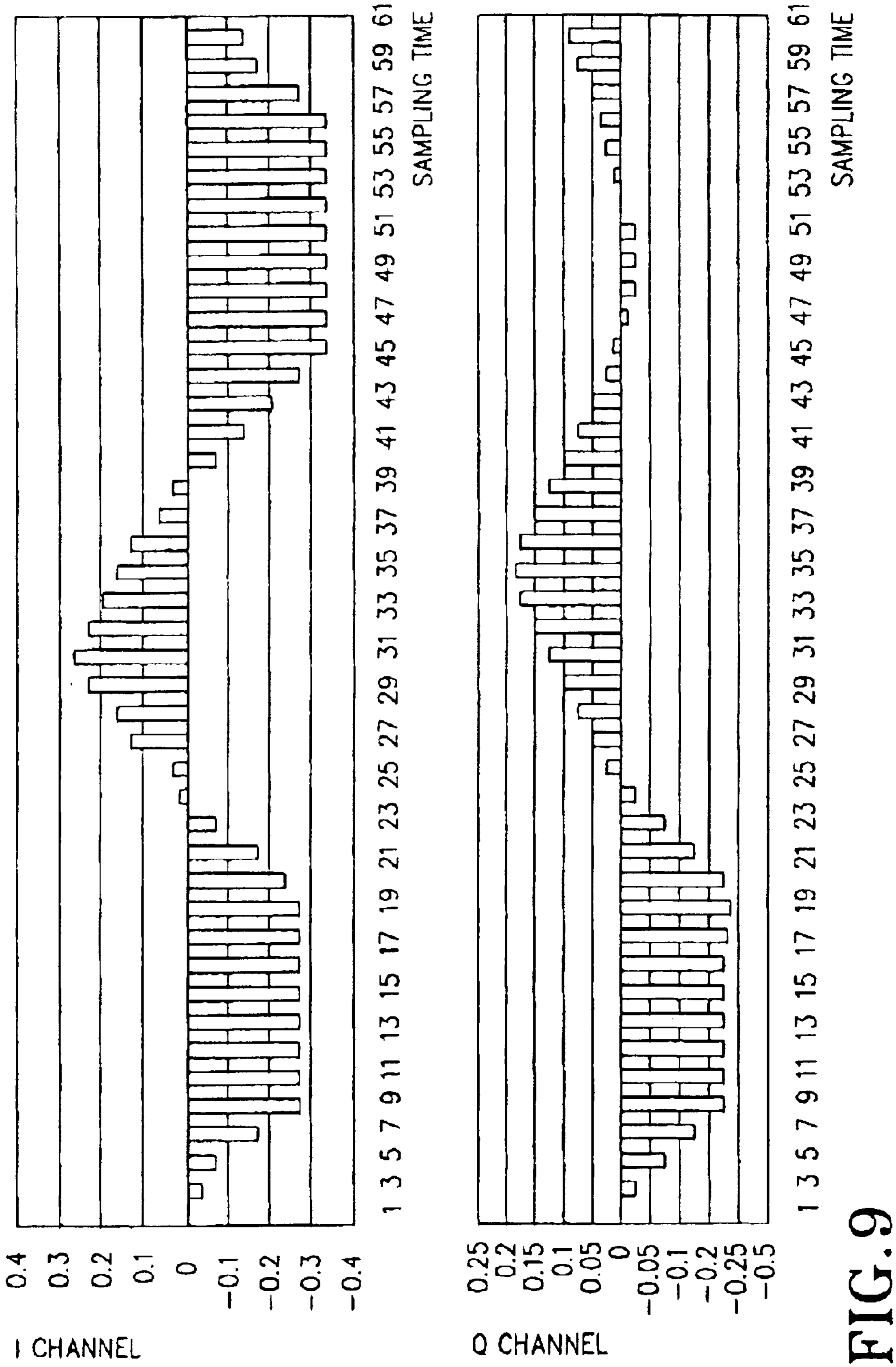
FIG. 9 illustrates target signals calculated in the cancellation signal calculator illustrated in FIG. 3.
Figure 10:
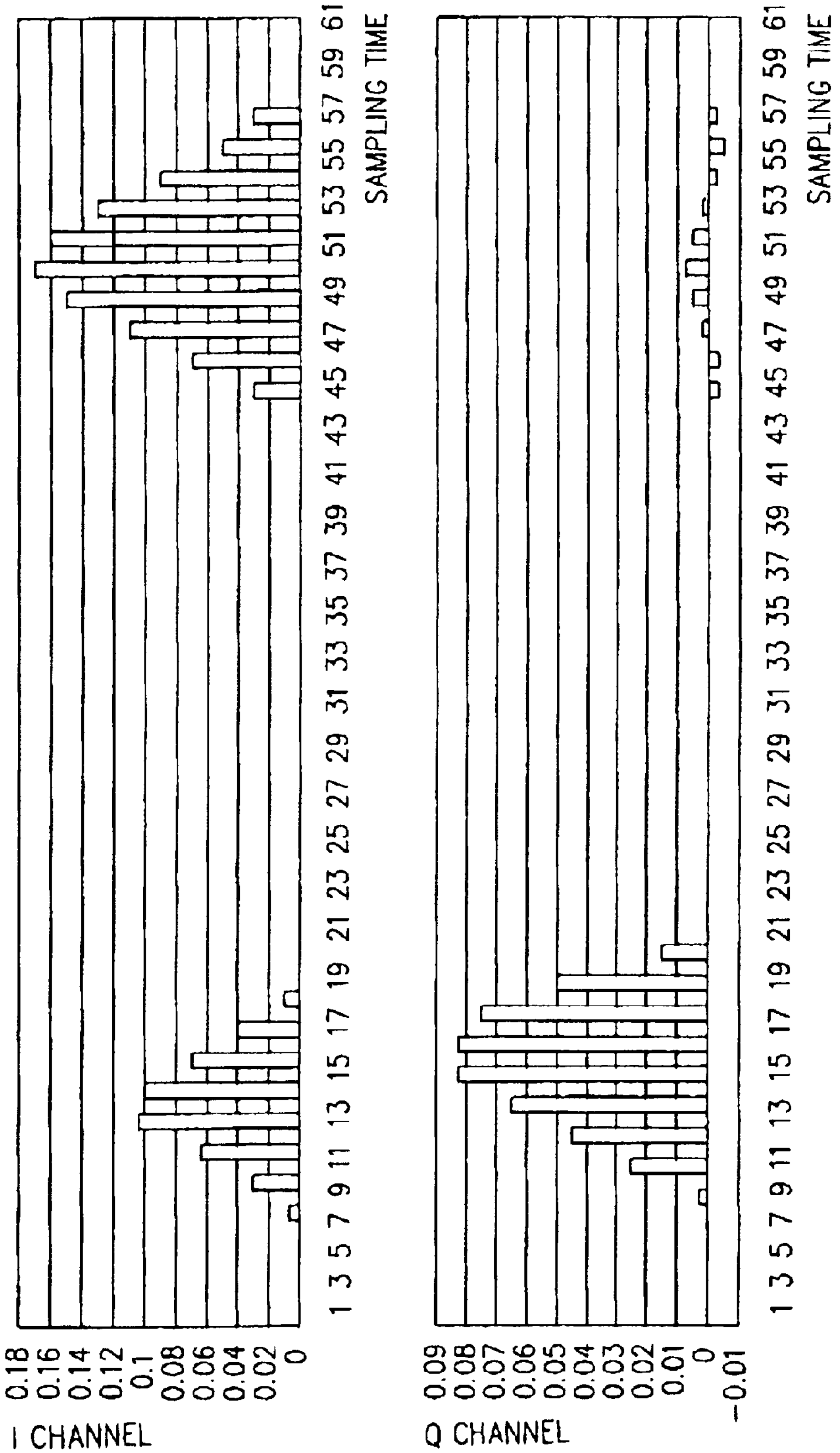
FIG. 10 illustrates cancellation signals generated in the cancellation signal calculator illustrated in FIG. 3.

FIG. 9 illustrates I and Q channel target signal pulses obtained by multiplying the original I and Q channel signals having higher instant power than the threshold power by scale values calculated at each sampling period, and FIG. 10 illustrates I and Q channel cancellation signal pulses obtained by subtracting the original signal pulses illustrated in FIG. 7 from the target signal pulses illustrated in FIG. 9 at each sampling period. Here it is to be noted that the cancellation signal pulses have the opposite phases to the original signals and the target signals.

Figure 11:
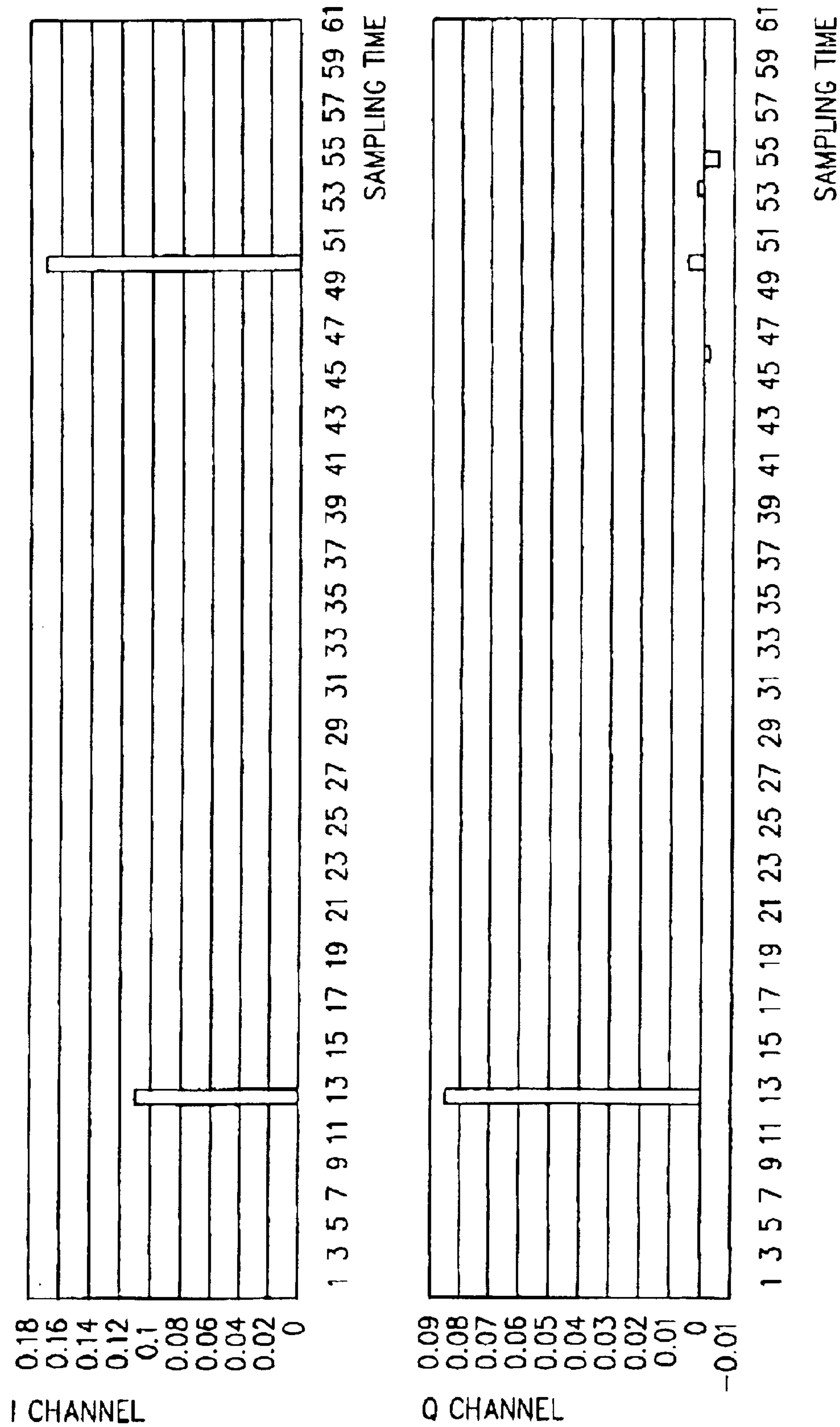
FIG. 11 illustrates cancellation signals at maximum signal levels selected in maximum level determiners illustrated in FIG. 3.
Figure 12:
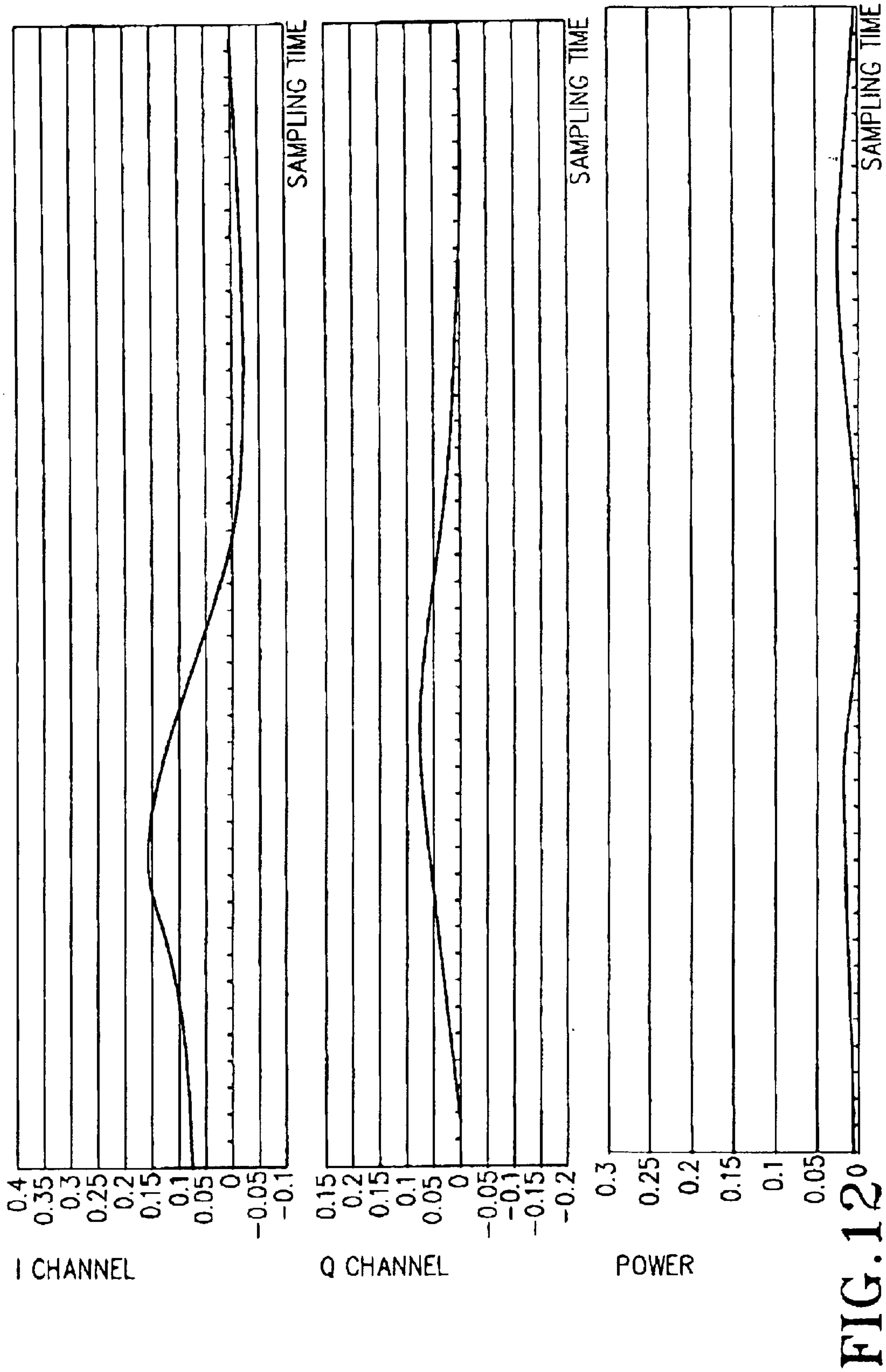
FIG. 12 illustrates the cancellation signals at the maximum signal levels after pulse shaping filtering and their power levels.

FIG. 11 illustrates I and Q channel cancellation signal pulses at the highest levels between pulses at signal level 0 among the cancellation signal pulses illustrated in FIG. 10. FIG. 12 illustrates pulse-shaping-filtered I and Q channel cancellation signals at the highest levels and their power levels. The I and Q channel cancellation signals illustrated in FIG. 12 are summed with the original I and Q channel signals illustrated in FIG. 7 in the summers 3-16 and 3-17. As a result, the outputs of the summers 3-16 and 3-17 have PAPRs required for the power amplifier 2-6.

Second Embodiment

The second embodiment of the present invention is applied to a BS in a mobile communication system supporting multiple FAs.

Figure 13:
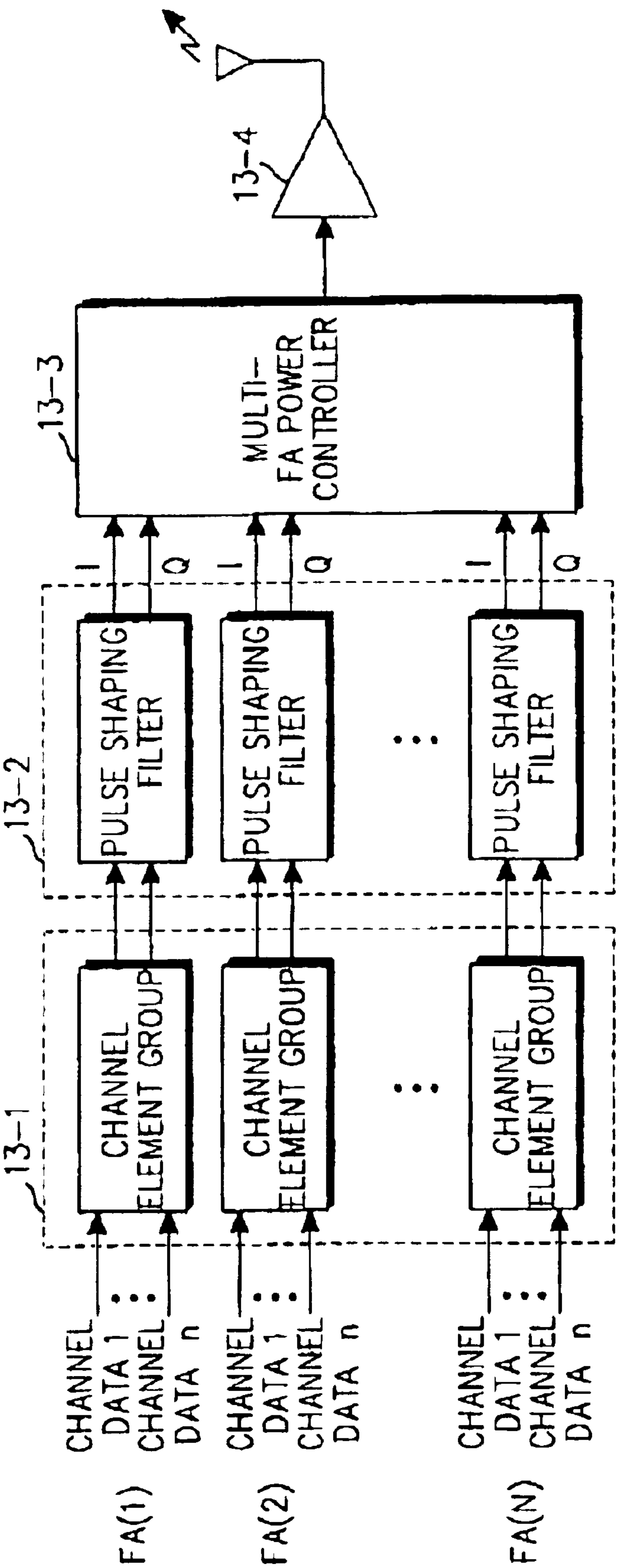
FIG. 13 is a block diagram of a transmitter in a mobile communication system using multiple FAs according to another embodiment of the present invention.

FIG. 13 is a block diagram of a BS transmitter in the mobile communication system using multiple FAs according to the second embodiment of the present invention.

Referring to FIG. 13, the transmitter includes a channel device unit 13-1, a pulse shaping filter unit 13-2, and a power amplifier 13-4. Especially, a multi-FA power controller 13-3 is disposed between the pulse shaping filter unit 13-2 and the power amplifier 13-4 to control the PAPRs of original FA signals.

In operation, the channel device unit 13-1 has a plurality of channel element groups corresponding to the FAs and each channel element group includes channel devices that are the same in configuration as the channel element group 2-1 illustrated in FIG. 2 and perform encoding, modulation and channelization on each FA baseband signal. The channel device unit 13-1 controls each FA independently. The pulse shaping filter unit 13-2 has a plurality of I and Q pulse shaping filters and limits the frequency bandwidth of I and Q channel signals output from the channel device unit 13-1 for each FA. The outputs of the pulse shaping filter unit 13-2 are applied to the input of the multi-FA power controller 13-3.

The transmission path of the multiple FA signals is similar to that of the single FA signal illustrated in FIG. 2. Specifically, the multi-FA power controller 13-3 outputs a power-controlled signal for the input of an input signal having a high PAPR to ensure the stable operation of the power amplifier 13-4. The power amplifier 13-4 amplifies the output signal of the multi-FA power controller 13-3 to radiate power enough to transmit the signal to all MSs within the coverage area of the cell.

Figure 14:
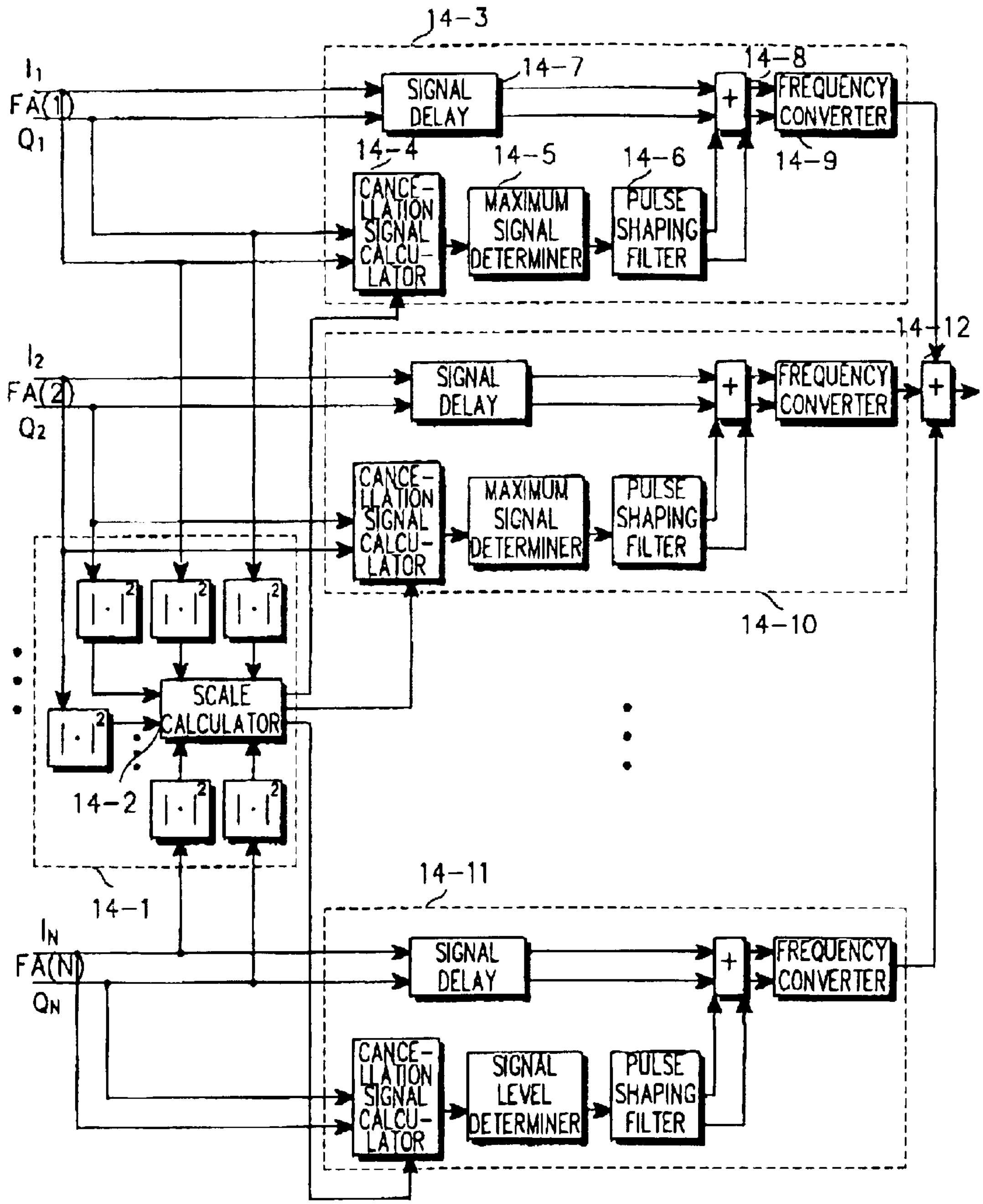
FIG. 14 is a detailed block diagram of a multi-FA power controller illustrated in FIG. 13.

FIG. 14 is a detailed block diagram of the multi-FA power controller 13-3 according to the second embodiment of the present invention. Referring to FIG. 14, the multi-FA power controller 13-3 is comprised of a scale determiner 14-1, a plurality of power controllers 14-3 and 14-10 to 14-11, and a summer 14-12. The power controllers 14-3 and 14-10 to 14-11 control the PAPR of each FA signal in the same manner as illustrated in FIG. 6 except that a scale value for each FA is calculated in correlation with the scale values of other FA signals.

The scale determiner 14-1 receives original multiple FA signals $I_1$, $Q_1$, $I_2$, $Q_2$, . . . , $I_N$, $Q_N$ at corresponding squarers and calculates their signal levels at each sampling period. A scale calculator 14-2 in the scale determiner 14-1 calculates scale values for the multiple FAs using their signal levels. The scale values are determined referring to a pre-stored scale table or calculated by Eq. (3).

The power controllers 14-3 and 14-10 to 14-11 perform the same operation as the power controller 2-8 as illustrated in FIG. 6 for their corresponding FAs. Hereinbelow the power controller 14-3 will be described on behalf of all of the power controllers.

A cancellation signal calculator 14-4 in the power controller 14-3 obtains I and Q channel target signals by multiplying original I and Q channel signals $I_1$ and $Q_1$ by a scale value $S_1$ for FA(1) received from the scale determiner 14-1 and calculates cancellation signals by subtracting the original I and Q channel signals $I_1$ and $Q_1$ from the target signals. A maximum signal determiner 14-5 selects cancellation signals at the highest levels between signals at signal level 0 among the cancellation signals received from the cancellation signal calculator 14-4 at each sampling period, setting the other cancellation signals to 0s. The selected cancellation signals are fed to a pulse shaping filter 14-6.

Meanwhile, a delay 14-7 delays the original I and Q channel signals $I_1$ and $Q_1$ and a summer 14-8 sums the delayed signals with the outputs of the pulse shaping filter 14-6, thereby generating power-controlled signals. A frequency converter 14-9 upconverts the frequency of the power-controlled signal to an RF signal for FA(1) using a different central frequency for each FA.

The power controllers 14-10 to 14-11 operate in the same manner and output signals of FA(2) to FA(N). The summer 14-12 sums the outputs of the power controllers 14-13 and 14-10 to 14-11 and outputs the sum to the power amplifier 13-4.

Figure 15:
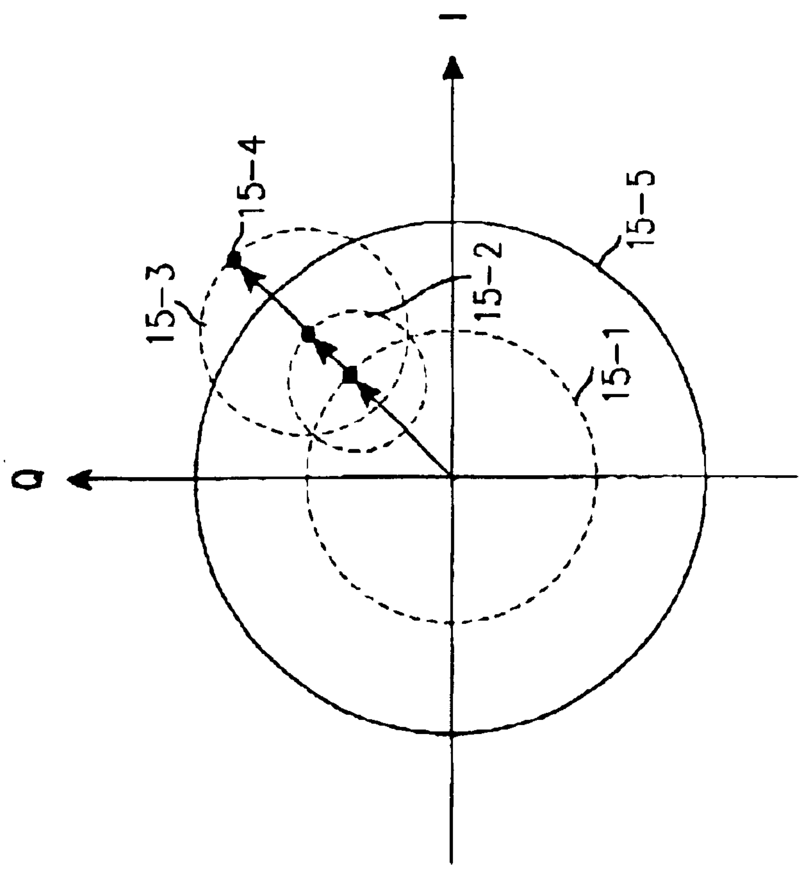
FIG. 15 illustrates the power characteristic of each FA signal in the multi-FA power controller in the case where FA signals have the same Priority.

FIG. 15 illustrates the output of the summer 14-12 in a system supporting three FAs. Referring to FIG. 15, reference numerals 15-1, 15-2 and 15-3 denote circles with radiuses being the levels of the original signals of FA(1), FA(2) and FA(3). Reference numeral 15-5 denotes a circle with a radius being the level of a reference signal predetermined to satisfy a PAPR requirement for the power amplifier 13-4. The frequencies of the original signals are in the relationship of FA(1)<FA(2)<FA(3). Due to the differences between the frequency bands, combining the FA(1) signal with the FA(2) signal results in the circle 15-2 with its central point on the circle 15-1, and combining the FA(2) signal with the FA(3) signal results in the circle 15-3 with its central point on the circle 15-2.

A signal level change of FA(1) is faster than that of FA(2) and the signal level change of FA(2) is faster than that of FA(3). Hence the level of an instant signal for each FA is not constant but changes periodically on a corresponding circle. Consequently, the maximum output of the summer 14-12 can be represented as a point 15-4. The maximum value is the sum of the signal levels of all FAs. To satisfy the condition that the sum of the instant signal levels is less than a threshold signal level, the scale values must be determined so that the output of the summer 14-12 lies inside the circle 15-5.

Thus, if the sum of the instant signal levels of the original signal for each FA is less than or equal to the threshold signal level, the multi-FA power controller 13-3 sets the scale values for the FAs to 1s. On the other hand, if the sum is greater than the threshold signal level, an appropriate scale value is calculated. Here, the same scale value is applied to all FAs, or a different scale value for each FA.

If each FA has a different scale value, this means that the FAs have different Priority (or Quality of Service), that is, priority levels. Thus, the BS can assign a different priority level to each FA. For example, a CDMA2000 EV-DO (Evolution Data Only) system discriminates an FA for first generation CDMA service from an FA for high speed data rate service. Since the FA supporting the high speed data rate service is sensitive to the quality of a transmission signal in view of the characteristics of the service, it should have a higher priority level than the FA supporting the first generation CDMA service.

Figure 16:
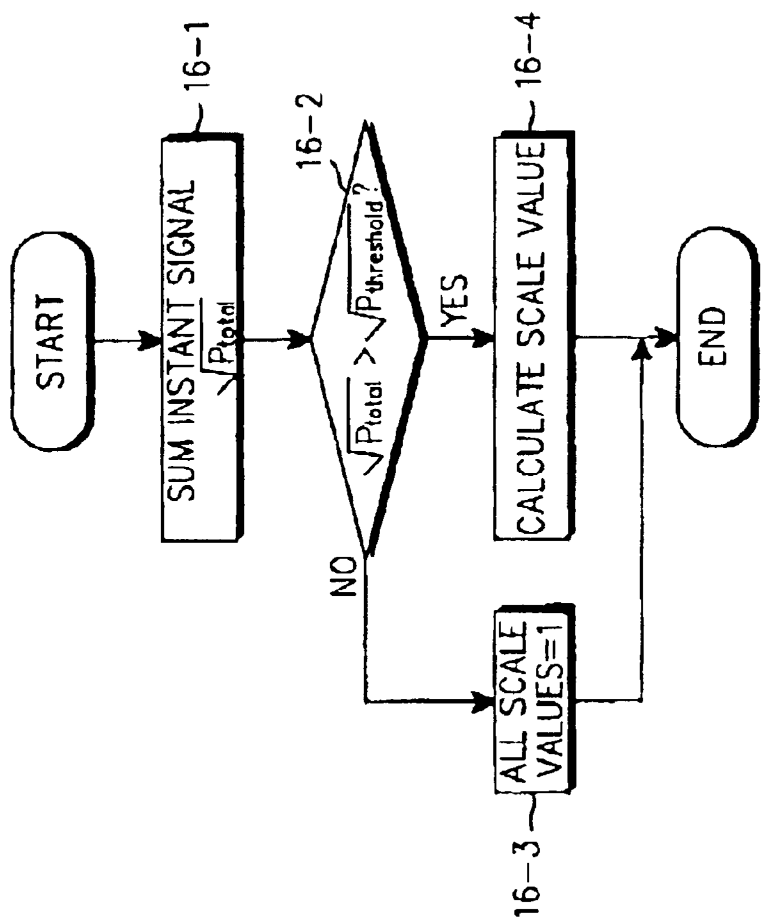
FIG. 16 is a flowchart illustrating a method of calculating scale values for multiple FAs that are the same in priority in a scale calculator illustrated in FIG. 14.

FIG. 16 is a flowchart illustrating a process for calculating a single scale value for N FAs having the same priority level in the scale calculator 14-2. Referring to FIG. 16, the instant signal level of FA(1) is the square root of the sum of the square of the level of the original FA(1) I channel signal $I_1$ and the square of the level of the original FA(1) Q channel signal $Q_1$ ($\sqrt{P_1}=\sqrt{I_1^2+Q_1^2}$). After the instant signal levels $\sqrt{P_i}$ (i=1, 2, . . . , N) are calculated for all FAs, they are summed to obtain the maxim output of the summer 14-12 ($\sqrt{P_{total}}=\sqrt{P_1}+\ldots+\sqrt{P_N}$) in step 16-1.

$\sqrt{P_{total}}$ is compared with a predetermined or calculated threshold signal level $\sqrt{P_{threshold}}$ in step 16-2. If $\sqrt{P_{total}}$ is less than or equal to $\sqrt{P_{threshold}}$, the scale values of all the FAs are set to 1s in step 16-3. If $\sqrt{P_{total}}$ is greater than $\sqrt{P_{threshhold}}$, the scale values S are calculated in step 16-2 by $$S=\frac{\sqrt{P_{threshold}}}{\sqrt{P_{total}}}=\frac{\sqrt{P_{threshold}}}{\sqrt{P_1}+\ldots+\sqrt{P_N}} \tag{3}$$

The scale values S are fed to the cancellation signal calculators 14-4 to be used for generation of cancellation signals in the case where the original signals have the highest signal levels possible.

The scale values for N FAs can be calculated using weighting factors or using threshold signal levels according to service classes.

In the former method, a different weighting factor is assigned to each FA signal to calculate the scale value of the FA.

Figure 17:
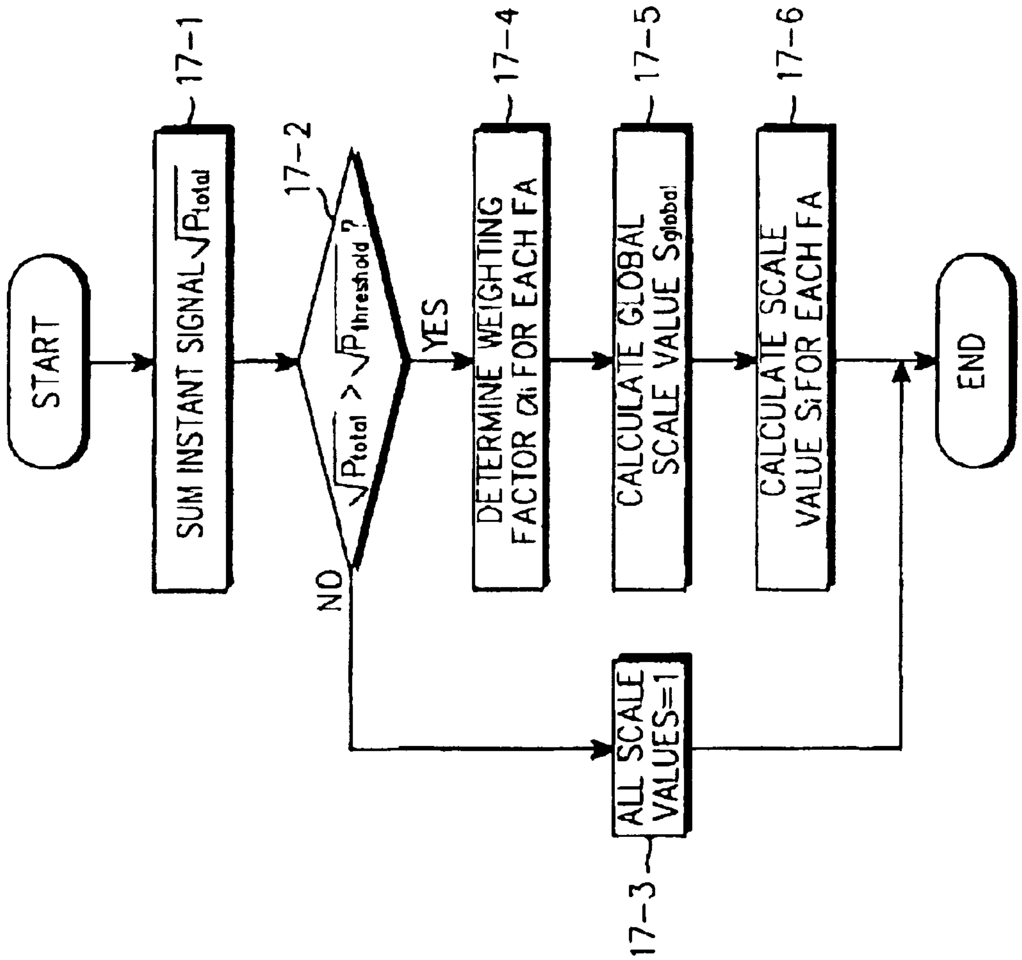
FIG. 17 is a flowchart illustrating a method of calculating scale values for multiple FAs that are different in priority in the scale calculator illustrated in FIG. 14.

Referring to FIG. 17, the instant signal level of FA(1) is the square root of the sum of the square of the level of the original FA(1) I channel signal $I_1$ and the square of the level of the original FA(1) Q channel signal $Q_1$ ($\sqrt{P_1}=\sqrt{I_1^2+Q_1^2}$). After the instant signal levels $\sqrt{P_1}$ (i=1, 2, . . . , N) are calculated for all FAs, they are summed to obtain the maxim output of the summer 14-12 ($\sqrt{P_{total}}=\sqrt{P_1}+\ldots+\sqrt{P_N}$) in step 17-1.

$\sqrt{P_{total}}$ is compared with a predetermined or calculated threshold signal level $\sqrt{P_{threshold}}$ in step 17-2. If $\sqrt{P_{total}}$ is less than or equal to $\sqrt{P_{threshold}}$, the scale values of all the FAs are set to is in step 17-3. If $\sqrt{P_{total}}$ is greater than $\sqrt{P_{threshold}}$, a weighting factor $\alpha_i$ for FA(1) is calculated according to the service class of FA(1) in step 17-4. The weighting factor $\alpha_i$ is a weighting factor for an ith FA. The original signals for all FAs with their weighting factors assigned are expressed as $\alpha_1\sqrt{P_1}$, $\alpha_2\sqrt{P_2}$, . . . , $\alpha_N\sqrt{P_N}$. A greater weighting factor must be assigned to a higher priority FA. The weighting factor of an FA can be determined to be the priority rate of the FA. If all FAs are categorized into service class 1 or service class 2 and service class 1 has priority over service class 2, a weighting factor 2 is assigned to the FAs of service class 1 and a weighting factor 1 to the FAs of service class 2.

In step 17-5, a global scale value $S_{global}$ is then calculated by $$S = \frac{\sqrt{P_{threshold}}}{\alpha_1\sqrt{P_1} + \alpha_2\sqrt{P_2} + \ldots + \alpha_N\sqrt{P_N}} = \frac{\sqrt{P_{threshold}}}{\sum_{i=1}^{N}(\alpha_i\sqrt{P_i})} \quad (4)$$

The scale value $S_i$ is calculated by multiplying the global scale value $S_{global}$ by a corresponding weighting factor $\alpha_i$ in step 17-6.

$$S_i = \alpha_i \times S_{global} = \alpha_i \times \frac{\sqrt{P_{threshold}}}{\sum_{i=1}^{N}(\alpha_i\sqrt{P_i})} \quad (5)$$

The scale values for the FAs are fed to the cancellation signal calculators 14-4. The weighting factors affect determination of the scale values for the FAs and the transmission power of a higher priority FA signal is limited less. Therefore, the efficiency of available transmission power is maximized.

Now a description will be made of a method of calculating the scale values according to the service classes with reference to FIGS. 18 and 19. In this method, the scale calculator 14-2 sets a threshold signal level for each FA.

Specifically, multiple FAs are first categorized into service class 1 to service class k in a descending order and a threshold signal level $\sqrt{P_{th\text{-}1}}, \sqrt{P_{th\text{-}2}}, \ldots \sqrt{P_{th\text{-}k}}$ is set for each FA. $\sqrt{P_{th\text{-}i}}$ is the threshold level for an ith FA according to its service class and a higher threshold signal level is set for a higher service class. That is, $\sqrt{P_{th\text{-}1}} > \sqrt{P_{th\text{-}2}} > \ldots > \sqrt{P_{th\text{-}k}}$. The sum of the threshold signal levels $\sqrt{P_{th\text{-}1}} + \sqrt{P_{th\text{-}2}} + \ldots + \sqrt{P_{th\text{-}k}}$ is less than or equal to the whole threshold signal level required in the system, $\sqrt{P_{threshold}}$.

In the CDMA2000 EV-DO system, the FAs supporting high speed data service and the FAs supporting the first generation CDMA service are categorized into service class 1 and service class 2, respectively.

Figure 18:
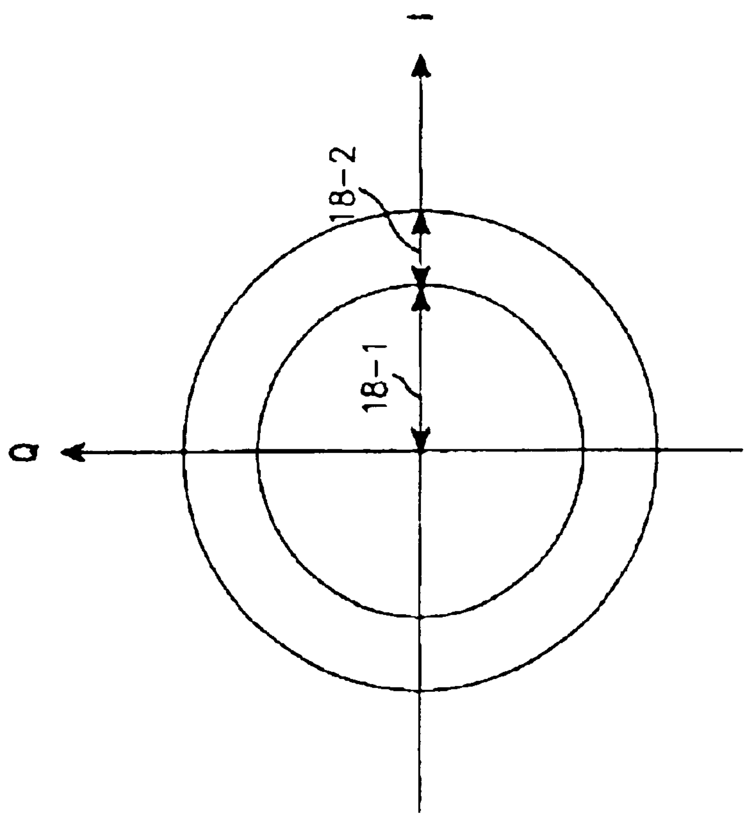
FIG. 18 illustrates the power characteristic of each FA signal in the multi-FA power controller in the case where FA signals have different Priority.

Referring to FIG. 18, threshold signal levels for service class 1 and service class 2 are represented as circles 18-1 and 18-2, respectively. Therefore, the outer circle in FIG. 18 represents the whole threshold signal level $\sqrt{P_{threshold}}$.

Figure 19:
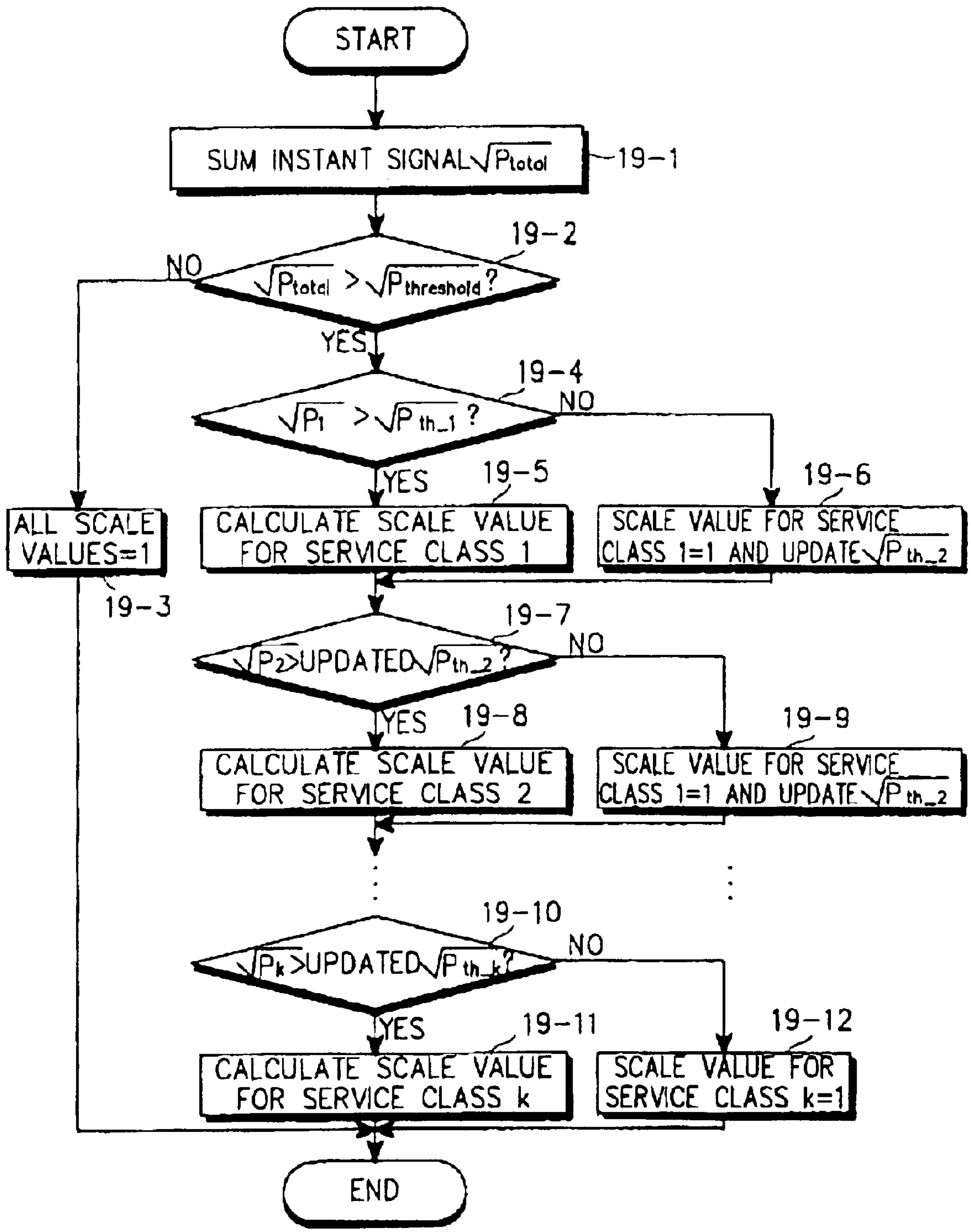
FIG. 19 is a flowchart illustrating another method of calculating scale values for multiple FAs that are different in priority in the scale calculator illustrated in FIG. 14.

Referring to FIG. 19, the instant signal level of FA(1) is the square root of the sum of the square of the level of the original FA(1) I channel signal $I_1$ and the square of the level of the original FA(1) Q channel signal $Q_1$ ($\sqrt{P_1} = \sqrt{I_1^2 + Q_1^2}$). After the instant signal levels $\sqrt{P_1}$ (i+1, 2, . . . , N) are calculated for all FAs, they are summed to obtain the maximum output of the summer 14-12 ($\sqrt{P_{total}} = \sqrt{P_1} + \ldots + \sqrt{P_N}$) in step 19-1.

$\sqrt{P_{total}}$ is compared with a predetermined(or calculated) whole threshold signal level $\sqrt{P_{threshold}}$ in step 19-2. If $\sqrt{P_{total}}$ is less than or equal to $\sqrt{P_{threshold}}$, the scale values of all the FAs are set to 1s in step 19-3. If $\sqrt{P_{total}}$ is greater than $\sqrt{P_{threshold}}$, the scale value of each FA is calculated according to its priority level.

The average of the instant signal levels of FAs with service class 1 $\sqrt{P_1}$ is first compared with the threshold signal level for service class 1, $\sqrt{P_{th\_1}}$ in step 19-4. If $\sqrt{P_1}$ is greater than $\sqrt{P_{th\_1}}$, the scale values for the FAs with service class 1 are $\sqrt{P_{th\_1}}/\sqrt{P_1}$ in step 19-5. On the other hand, if $\sqrt{P_1}$ is less than or equal to $\sqrt{P_{th\_1}}$, the scale values are set to 1s and the threshold signal level for FAs of service class 2 is updated by $\sqrt{P_{th\_2}} = \sqrt{P_{th\_2}} + (\sqrt{P_{th\_1}} - \sqrt{P_1})$ in step 19-6 in order to assign the remaining power $\sqrt{P_{th\_1}} - \sqrt{P_1}$) from the FAs with service class 1 to the FAs with service class 2 and thus increase the efficiency of power use.

In the same manner, the average $\sqrt{P_2}$ of the instant signal levels of FAs with service class 2 is compared with the updated threshold signal level $\sqrt{P_{th\_2}}$ for service class 2 in step 19-7. If $\sqrt{P_2}$ is greater than the updated $\sqrt{P_{th\_2}}$, the scale values for the FAs with service class 2 are $\sqrt{P_{th\_2}}/\sqrt{P_2}$ in step 19-8. On the other hand, if $\sqrt{P_2}$ is less than or equal to the updated $\sqrt{P_{th\_2}}$, the scale values are set to 1s and the threshold signal level for FAs of service class 3 is updated by $\sqrt{P_{th\_3}} = \sqrt{P_{th\_3}} + (\sqrt{P_{th\_2}} - \sqrt{P_2})$ in step 19-9.

When the scale value for FAs with the lowest service class k is determined in steps 19-10, 19-11, and 19-12, the scale values are fed to the cancellation signal calculators 14-4. The control of the threshold signal levels ensures minimum performance according to the characteristics of each FA signal.

In accordance with the present invention as described above, (1) the power controller can be simply realized for variable systems including DS-CDMA, W-CDMA and MC-CDMA and used together with a pre-distortion adjusting circuit; (2) the inefficient operation of a power amplifier caused by a high PAPR due to the sum of control signals and user data for multiple users in a system such as CDMA can be improved; (3) performance deterioration is minimized without using an expensive power amplifier, thereby decreasing the overall system cost; and (4) especially in a multi-FA mobile communication system, minimum performance can be ensured according to the characteristics of each FA signal during transmission of multi-FA signals and the efficiency of power use can be maximized in the process of controlling a scale value for each FA signal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmission power controlling apparatus in a mobile communication system supporting a single FA (Frequency Allocation), comprising:

- a channel device group for generating an I (In phase) channel baseband signal and a Q (Quadrature phase) channel baseband signal from channel data;
- a pulse shaping filter for pulse-shape-filtering the baseband signals;
- a power controller for controlling the PAPRs (Peak-to-Average power Ratio) of the pulse-shape-filtered signals according to a threshold power required for linear power amplification; and
- a frequency converter for upconverting the power-controlled signals to RF (Radio Frequency) signals and outputting the RF signals, wherein the power controller comprises:

- a scale determiner for receiving original I and Q channel signals from the pulse shaping filter, measuring the instant power of the original I and Q channel signals at each sampling period, comparing the instant power with the threshold power, and determining scale values according to the comparison result;
- a cancellation signal calculator for calculating target signals by multiplying the original I and Q channel signals by the scale values and calculating cancellation signals by subtracting the original I and Q channel signals from the target signals;
- a signal delay for delaying the original I and Q channel signals by a time required for the operations of the cancellation signal calculator and the scale determiner and a summer for adding the delayed signals to the pulse-shape-filtered signals.

2. The transmission power controlling apparatus of claim 1, wherein the power controller further comprises:

a maximum signal determiner for receiving the cancellation signals from the cancellation signal calculator at each sampling period and selecting cancellation signals at the highest levels; and a pulse shaping filter for pulse-shape-filtering the selected highest level cancellation signals before the summation.

3. The transmission power controlling apparatus of claim 2, wherein the maximum signal determiner selects the cancellation signals at the highest levels among successive cancellation signals other than 0s.

4. The transmission power controlling apparatus of claim 1, wherein the scale values are determined by the following equation $$\text{if instant power} \le \text{threshold power, then scale value} = 1$$

$$\text{if instant power} > \text{threshold power,}$$

$$\text{then scale value} = \sqrt{\frac{\text{threshold power}}{\text{instant power}}}.$$

5. The transmission power controlling apparatus of claim 1, wherein the threshold power is determined by the following equation $$P_{th} = \text{average power}(P_{average}) \times 10^{(backoff/10)}$$

where $P_{th}$ is the threshold power, $P_{average}$ is the average power of the mobile communication system, and backoff is the ratio of a maximum power required to achieve linear amplification to the average power.

6. A method of controlling transmission power in a mobile communication system supporting a single FA (Frequency Allocation), comprising the steps of:

generating an I (In phase) channel baseband signal and a Q (Quadrature phase) channel baseband signal from channel data;

pulse-shape-filtering the baseband signals;

controlling the PAPRs (Peak-to-Average power Ratio) of the pulse-shape-filtered signals according to a threshold power required for linear power amplification; and upconverting the power-controlled signals to RE (Radio Frequency) signals and outputting the RE signals, wherein the PAPR controlling step further comprises the steps of:

receiving original pulse-shape-filtered signals, measuring the instant power of the original pulse-shape-filtered signals at each sampling period, and determining scale values by comparing the instant power with a threshold power;

calculating target signals by multiplying the original signals by the scale values and calculating cancellation signals by subtracting the original signals from the target signals; and combining the cancellation signals to the original pulse-shape-filtered signals.

7. The method of claim 6, further comprising the steps of:

receiving the cancellation signals at each sampling period and selecting cancellation signals at the highest levels; and pulse-shape-filtering the selected highest level cancellation signals before the combining.

8. The method of claim 7, wherein the cancellation signals at the highest levels are selected among successive cancellation signals other than 0s.

9. The method of claim 6, further comprising the step of delaying the original signals by a predetermined time to be in the same phase as the selected cancellation signals before the combining.

10. The method of claim 6, wherein the scale values are determined by the following equation $$\text{if instant power} \le \text{threshold power, then scale value} = 1$$

$$\text{if instant power} > \text{threshold power,}$$

$$\text{then scale value} = \sqrt{\frac{\text{threshold power}}{\text{instant power}}}.$$

11. The method of claim 6, wherein the threshold power is determined by the following equation $$P_{th} = \text{average power}(P_{average}) \times 10^{(backoff/10)}$$

where $P_{th}$ is the threshold power, $P_{average}$ is the average power of the mobile communication system, and backoff is the ratio of a maximum power required to achieve linear amplification to the average power.

12. A transmission power controlling apparatus in a mobile communication system supporting a plurality of FAs (Frequency Allocations), comprising:

a plurality of channel device groups for generating I (In phase) channel baseband signals and Q (Quadrature phase) channel baseband signals from channel data for the FAs;

a plurality of pulse shaping filters connected to the channel device groups, for pulse-shape-filtering the FA baseband signals; and an FA power controller for controlling the PAPRs (Peak-to-Average power Ratio) of the pulse-shape-filtered signals according to a threshold power required for linear power amplification, wherein the FA power controller comprises:

a scale determiner for receiving original I and Q channel signals of the FAs from the pulse shaping filters, measuring the instant signal of the original I and Q channel signals at each sampling period, comparing the instant power with a threshold power, and determining scale values according to the comparison result;

a plurality of power controllers corresponding to the FAs, for controlling the PAPRs of the original FA signals using the scale values; and a summer for summing the outputs of the power controllers.

13. The transmission power controlling apparatus of claim 12, wherein each of the power controllers comprises:

a cancellation signal calculator for calculating target signals by multiplying the original I and Q channel signals by the scale values and calculating cancellation signals by subtracting the original I and Q channel signals from the target signals;

a signal delay for delaying the original I and Q channel signals by time required for the operations of the scale determiner and the cancellation signal calculator; and a summer for adding the delayed signals to the cancellation signals.

14. The transmission power controlling apparatus of claim 13, wherein each of the power controller comprises:

a maximum signal determiner for receiving the cancellation signals at each sampling period and selecting cancellation signals at the highest levels; and a maximum signal pulse shaping filter for pulse-shape-filtering the selected highest level cancellation signals.

15. The transmission power controlling apparatus of claim 14, wherein the maximum signal determiner selects the cancellation signals at the highest levels among successive cancellation signals other than 0s.

16. The transmission power controlling apparatus of claim 12, wherein if the plurality of FAs have the same service class, each of the scale values is determined by the following equation, $$\text{if } \sqrt{P_1} + \ldots \sqrt{P_N} \leq \sqrt{P_{th}}, \text{ then } S_i = 1$$

$$\text{if } \sqrt{P_1} + \ldots \sqrt{P_N} \rangle \sqrt{P_{th}}, \text{ then } S_i = \frac{\sqrt{P_{th}}}{\sqrt{P_1} + \ldots \sqrt{P_N}}$$

where $P_i$(i=1, 2, . . . , N) is the instant power of an ith FA signal, $P_{th}$ is the threshold power, and $S_i$ is a scale value for the ith FA.

17. The transmission power controlling apparatus of claim 12, wherein if the plurality of FAs have different service classes, each of the scale values is determined by the following equation, $$S_i = \alpha_i \times \frac{\sqrt{P_{th}}}{\sum_{i=1}^{N} (\alpha_i \sqrt{P_i})}$$

where $S_i$ is the scale value of an ith FA (i=1, 2, . . . , N), $\alpha_i$ is a weighting factor assigned to the ith FA, $P_{th}$ is the threshold power, and $P_i$ is the instant power of the ith FA signal.

18. The transmission power controlling apparatus of claim 12, wherein if the plurality of FAs have different service classes, each of the scale values is determined by the following equation, $$\text{if } P_i \leq P_{\text{th\_i}}, \text{ then } S_i = 1$$

$$\text{if } P_i \rangle P_{\text{th\_i}}, \text{ then } S_i = \frac{\sqrt{P_{\text{th\_i}}}}{\sqrt{P_i}}$$

where $P_i$ is the instant power (i=1, 2, . . . , N), $P_{th\_i}$ is a threshold power for the service class of an ith FA, and $S_i$ is a scale value for the ith FA signal.

19. The transmission power controlling apparatus of claim 18, wherein if a FA signal having a higher service class than the ith FA signal has a scale value of 1, the threshold power of the ith FA signal is updated by adding the ith threshold power ($P_{th\_i}$) to the remaining power from the threshold power of the FA of the higher service class.

20. The transmission power controlling apparatus of claim 19, wherein the remaining power is the difference between the threshold power and the instant power of the FA signal of the higher service class.

21. The transmission power controlling apparatus of claim 12, wherein the threshold power is determined by the following equation $$P_{th} = \text{average power}(P_{average}) \times 10^{(backoff/10)}$$

where $P_{th}$ is the threshold power, $P_{average}$ is the average power of the mobile communication system, and backoff is the ratio of a maximum power required to achieve linear amplification to the average power.

22. A method of controlling transmission power in a mobile communication system supporting a plurality of FAs (Frequency Allocations), comprising the steps of:

generating I (In phase) channel baseband signals and Q (Quadrature phase) channel baseband signals from channel data for the FAs;

pulse-shape-filtering the FA baseband signals; and controlling the PAPRs (Peak-to-Average power Ratio) of the pulse-shape-filtered signals according to a threshold power required for linear power amplification, and outputting the PAPR-controlled signals in an RF band, wherein the PAPR controlling step further comprises the steps of:

receiving the original pulse-shape-filtered signals of each FA, measuring the instant power of the original pulse-shape-filtered signals at each sampling period, and determining a scale value for the FA by comparing the instant power with a threshold power;

controlling the PAPRs of the original FA signals using the scale value; and combining the PAPR-controlled FA signals.

23. The method of claim 22, wherein the PAPR controlling step comprises the steps of:

calculating target signals by multiplying the original FA signals by the scale value and calculating cancellation signals by subtracting the original FA signals from the target signals; and summing the cancellation signals to the original signals.

24. The method of claim 23, further comprising the steps of:

receiving the cancellation signals at each sampling period and selecting cancellation signals at the highest levels; and pulse-shape-filtering the selected highest level cancellation signals before the summation.

25. The method of claim 24, wherein the cancellation signals at the highest levels are selected among successive cancellation signals other than 0s.

26. The method of claim 23, further comprising the step of delaying the original signals by a predetermined time to be in the same phase as the selected cancellation signals before the summation.

27. The method of claim 22, wherein if the plurality of FAs have the same service class, each of the scale values is determined by the following equation, $$\text{if } \sqrt{P_1} + \ldots \sqrt{P_N} \leq \sqrt{P_{th}}, \text{ then } S_i = 1$$

$$\text{if } \sqrt{P_1} + \ldots \sqrt{P_N} \rangle \sqrt{P_{th}}, \text{ then } S_i = \frac{\sqrt{P_{th}}}{\sqrt{P_1} + \ldots \sqrt{P_N}}$$

where $P_i$(i=1, 2, . . . , N) is the instant power of an ith FA signal, $P_{th}$ is the threshold power, and $S_i$ is a scale value for the ith FA.

28. The method of claim 22, wherein if the plurality of FAs have different service classes, each of the scale values is determined by the following equation, $$S_i = \alpha_i \times \frac{\sqrt{P_{th}}}{\sum_{i=1}^{N}\left(\alpha_i \sqrt{P_i}\right)}$$

where $S_i$ is the scale value of an ith FA (i=1, 2, . . . , N), $\alpha_i$ is a weighting factor assigned to the ith FA, $P_{th}$ is the threshold power, and $P_i$ is the instant power of the ith FA signal.

29. The method of claim 22, wherein if the plurality of FAs have different service classes, each of the scale values is determined by the following equation, $$\text{if } P_i \le P_{\text{th\_i}}, \text{ then } S_i = 1$$

$$\text{if } P_i \rangle P_{\text{th\_i}}, \text{ then } S_i = \frac{\sqrt{P_{\text{th\_i}}}}{\sqrt{P_i}}$$

where $P_i$ is the instant power (i=1, 2, . . . , N) of an ith FA, $P_{th\_i}$ is a threshold power for the service class of an ith FA, and $S_i$ is a scale value for the ith FA signal.

30. The method of claim 29, wherein if an FA signal having a higher service class than the ith FA signal has a scale value of 1, the threshold power of the ith FA signal is updated by adding the ith threshold power ($P_{th\_i}$) to the remaining power from the threshold power of the FA of the higher service class.

31. The method of claim 30, wherein the remaining power is the difference between the threshold power and the instant power of the FA signal of the higher service class.

32. The method of claim 22, wherein the threshold power is determined by the following equation $$P_{th} = \text{average power}(P_{average}) \times 10^{(backoff/10)}$$

where $P_{th}$ is the threshold power, $P_{average}$ is the average power of the mobile communication system, and backoff is the ratio of a maximum power required to achieve linear amplification to the average power.

* * * * *